(12) United States Patent
Lee et al.

(10) Patent No.: US 10,380,022 B2
(45) Date of Patent: Aug. 13, 2019

(54) HYBRID MEMORY MODULE AND SYSTEM AND METHOD OF OPERATING THE SAME

(71) Applicant: Netlist, Inc., Irvine, CA (US)

(72) Inventors: Hyun Lee, Ladera Ranch, CA (US); Jayesh R. Bhakta, Cerritos, CA (US); Chi She Chen, Walnut, CA (US); Jeffery C. Solomon, Irvine, CA (US); Mario Jesus Martinez, Laguana Niguel, CA (US); Hao Le, Santa Ana, CA (US); Soon J. Choi, Irvine, CA (US)

(73) Assignee: Netlist, Inc., Irvine, CA (US)

( * ) Notice: Subject to any disclaimer, the term of this patent is extended or adjusted under 35 U.S.C. 154(b) by 286 days.

(21) Appl. No.: 14/536,588

(22) Filed: Nov. 7, 2014

(65) Prior Publication Data

US 2015/0169238 A1 Jun. 18, 2015

Related U.S. Application Data

(60) Provisional application No. 61/901,439, filed on Nov. 7, 2013, provisional application No. 61/929,942, filed
(Continued)

(51) Int. Cl.
*G06F 5/10* (2006.01)
*G06F 12/0871* (2016.01)
(Continued)

(52) U.S. Cl.
CPC ........ *G06F 12/0871* (2013.01); *G06F 3/0656* (2013.01); *G06F 3/0688* (2013.01);
(Continued)

(58) Field of Classification Search
CPC .. G06F 13/28; G06F 13/1684; G06F 13/1657; G06F 12/0879; G06F 3/0656;
(Continued)

(56) References Cited

U.S. PATENT DOCUMENTS 2,043,099 A 2/1936 Hanna
3,562,555 A 2/1971 Ahrons
(Continued)

FOREIGN PATENT DOCUMENTS

CN 1051994 A 6/1991
CN 101563729 A 10/2009
(Continued)

OTHER PUBLICATIONS

International Search Report and Written Opinion in PCT/US2014/064698, dated Aug. 14, 2015.
(Continued)

*Primary Examiner* — Tuan V Thai
*Assistant Examiner* — Candice A Rankin
(74) *Attorney, Agent, or Firm* — Morgan, Lewis & Bockius LLP

(57) ABSTRACT

A memory module comprises a volatile memory subsystem configured to coupled to a memory channel in computer system and capable of serving as main memory for the computer system, a non-volatile memory subsystem providing storage for the computer system, and a module controller coupled to the volatile memory subsystem, the non-volatile memory subsystem, and the C/A bus. The module controller is configured to control intra-module data transfers between the volatile memory subsystem and the non-volatile memory subsystem. The module controller is further configured to monitor C/A signals on the C/A bus and schedule the intra-module data transfers in accordance with the C/A signals so that the intra-module data transfers do not conflict with accesses to the volatile memory subsystem by the memory controller.

26 Claims, 31 Drawing Sheets

Related U.S. Application Data on Jan. 21, 2014, provisional application No. 62/041,024, filed on Aug. 22, 2014, provisional application No. 62/056,469, filed on Sep. 26, 2014, provisional application No. 62/067,411, filed on Oct. 22, 2014, provisional application No. 61/989,941, filed on May 7, 2014.

(51) Int. Cl.
   *G06F 3/06* (2006.01)
   *G06F 12/0897* (2016.01)
   *G06F 13/28* (2006.01)

(52) U.S. Cl.
   CPC .......... *G06F 12/0897* (2013.01); *G06F 13/28* (2013.01); *G06F 2206/1014* (2013.01); *G06F 2212/214* (2013.01); *G06F 2212/313* (2013.01); *G06F 2212/7201* (2013.01); *G06F 2212/7208* (2013.01)

(58) Field of Classification Search
   CPC ...... G06F 9/544; G06F 13/24; G06F 13/4059; G06F 13/1626; G06F 3/0679; G06F 12/0871; G06F 3/064; G06F 11/3485; G06F 12/0868; G06F 2221/2123; G06F 2212/7203
   See application file for complete search history.

(56) References Cited

U.S. PATENT DOCUMENTS

| | | |
|---|---|---|
| 3,916,390 A | 10/1975 | Chang et al. |
| 4,234,920 A | 11/1980 | Van Ness et al. |
| 4,420,821 A | 12/1983 | Hoffman |
| 4,449,205 A | 5/1984 | Hoffman |
| 4,965,828 A | 10/1990 | Ergott, Jr. et al. |
| 5,430,742 A | 7/1995 | Jeddeloh et al. |
| 5,519,663 A | 5/1996 | Harper, Jr. et al. |
| 5,519,831 A | 5/1996 | Holzhammer |
| 5,563,839 A | 10/1996 | Herdt et al. |
| 5,577,213 A | 11/1996 | Avery et al. |
| 5,619,644 A | 4/1997 | Crockett et al. |
| 5,675,725 A | 10/1997 | Malcolm |
| 5,758,149 A | 5/1998 | Bierma |
| 5,870,350 A | 2/1999 | Bertin et al. |
| 5,874,995 A | 2/1999 | Naimpally et al. |
| 5,890,192 A | 3/1999 | Lee et al. |
| 5,953,215 A | 9/1999 | Karabatsos |
| 6,023,421 A | 2/2000 | Clinton et al. |
| 6,026,465 A | 2/2000 | Mills et al. |
| 6,065,092 A | 5/2000 | Roy |
| 6,112,310 A | 8/2000 | Jun et al. |
| 6,145,068 A | 11/2000 | Lewis |
| 6,158,015 A | 12/2000 | Klein |
| 6,199,142 B1 | 3/2001 | Saulsbury et al. |
| 6,216,247 B1 | 4/2001 | Creta et al. |
| 6,269,382 B1 | 7/2001 | Cabrera et al. |
| 6,336,174 B1 | 1/2002 | Li et al. |
| 6,336,176 B1 | 1/2002 | Leyda et al. |
| 6,421,279 B1 | 7/2002 | Tobita et al. |
| 6,459,647 B1 | 10/2002 | Kengeri |
| 6,487,102 B1 | 11/2002 | Halbert et al. |
| 6,487,623 B1 | 11/2002 | Emerson et al. |
| 6,571,244 B1 | 5/2003 | Larson |
| 6,614,685 B2 | 9/2003 | Wong |
| 6,658,507 B1 | 12/2003 | Chan |
| 6,691,209 B1 | 2/2004 | O'Connell |
| 6,721,860 B2 | 2/2004 | Klein |
| 6,769,081 B1 | 7/2004 | Parulkar |
| 6,799,241 B2 | 9/2004 | Kahn et al. |
| 6,799,244 B2 | 9/2004 | Tanaka et al. |
| 6,816,982 B2 | 11/2004 | Ravid |
| 6,944,042 B2 | 9/2005 | Komatsuzaki |
| 6,948,029 B2 | 9/2005 | Yano |
| 6,952,368 B2 | 10/2005 | Miura et al. |
| 7,053,470 B1 | 5/2006 | Sellers et al. |
| 7,062,618 B2 | 6/2006 | Tsunoda et al. |
| 7,089,412 B2 | 8/2006 | Chen |
| 7,102,391 B1 | 9/2006 | Sun et al. |
| 7,111,142 B2 | 9/2006 | Spencer et al. |
| 7,136,978 B2 | 11/2006 | Miura et al. |
| 7,155,627 B2 | 12/2006 | Matsui |
| 7,200,021 B2 | 4/2007 | Raghuram |
| 7,234,099 B2 | 6/2007 | Gower et al. |
| 7,353,325 B2 | 4/2008 | Lofgren et al. |
| 7,409,590 B2 | 8/2008 | Moshayedi et al. |
| 7,411,859 B2 | 8/2008 | Sohn et al. |
| 7,421,552 B2 | 9/2008 | Long |
| 7,409,491 B2 | 12/2008 | Doblar et al. |
| 7,467,251 B2 | 12/2008 | Park et al. |
| 7,600,142 B2 | 10/2009 | Ichikawa |
| 7,716,411 B2 | 5/2010 | Panabaker et al. |
| 7,818,488 B2 | 10/2010 | Park et al. |
| 8,086,955 B2 | 12/2011 | Zhou et al. |
| 8,102,614 B2 | 1/2012 | Song et al. |
| 8,233,303 B2 | 7/2012 | Best et al. |
| 8,301,833 B1 | 10/2012 | Chen et al. |
| 8,407,395 B2 | 3/2013 | Kim et al. |
| 8,412,879 B2 | 4/2013 | Chang et al. |
| 8,516,187 B2 | 8/2013 | Chen et al. |
| 8,671,243 B2 | 3/2014 | Chen et al. |
| 8,677,060 B2 | 3/2014 | Chen et al. |
| 8,874,831 B2 | 10/2014 | Lee et al. |
| 8,880,791 B2 | 11/2014 | Chen et al. |
| 8,904,098 B2 | 12/2014 | Amidi et al. |
| 8,904,099 B2 | 12/2014 | Chen et al. |
| 9,336,135 B1 | 5/2016 | Salessi et al. |
| 9,405,684 B1* | 8/2016 | Derbeko .................. G06F 3/06 |
| 2002/0083368 A1 | 6/2002 | Abe et al. |
| 2002/0199061 A1 | 12/2002 | Friedman et al. |
| 2003/0028733 A1 | 2/2003 | Tsunoda et al. |
| 2003/0158995 A1 | 8/2003 | Lee et al. |
| 2004/0010473 A1 | 1/2004 | Hsu |
| 2004/0017630 A1* | 1/2004 | Akagi .................. G11B 19/28 360/69 |
| 2004/0049629 A1* | 3/2004 | Miura .................. G06F 11/1068 711/105 |
| 2004/0088508 A1 | 5/2004 | Ballard et al. |
| 2004/0163027 A1 | 8/2004 | Maclaren et al. |
| 2004/0190210 A1 | 9/2004 | Leete |
| 2005/0044302 A1 | 2/2005 | Pauley et al. |
| 2005/0060488 A1 | 3/2005 | Poechmueller |
| 2005/0132250 A1 | 6/2005 | Hansen et al. |
| 2005/0141273 A1 | 6/2005 | Park et al. |
| 2005/0172074 A1 | 8/2005 | Sinclair |
| 2005/0249011 A1 | 11/2005 | Maeda |
| 2005/0273548 A1 | 12/2005 | Roohparvar |
| 2005/0280623 A1* | 12/2005 | Tani .................. G09G 3/3611 345/98 |
| 2006/0039197 A1 | 2/2006 | Khouri et al. |
| 2006/0069896 A1 | 3/2006 | Sanders |
| 2006/0075057 A1 | 4/2006 | Gildea et al. |
| 2006/0080515 A1 | 4/2006 | Spiers et al. |
| 2006/0212651 A1 | 9/2006 | Ashmore |
| 2006/0230032 A1 | 10/2006 | Brannkov |
| 2006/0294295 A1 | 12/2006 | Fukuzo |
| 2007/0070669 A1 | 3/2007 | Tsern |
| 2007/0130416 A1 | 6/2007 | Yada et al. |
| 2007/0136523 A1 | 6/2007 | Bonella et al. |
| 2007/0174602 A1 | 7/2007 | Kao |
| 2007/0192627 A1 | 8/2007 | Oshikiri |
| 2008/0080261 A1 | 4/2008 | Shaeffer et al. |
| 2008/0104344 A1 | 5/2008 | Shimozono et al. |
| 2008/0195806 A1 | 8/2008 | Cope |
| 2009/0031099 A1 | 1/2009 | Sartore |
| 2009/0113158 A1* | 4/2009 | Schnell .................. G06F 1/10 711/167 |
| 2009/0327578 A1* | 12/2009 | Cagno .................. G06F 12/0246 711/103 |
| 2010/0110748 A1 | 5/2010 | Best |
| 2010/0188883 A1* | 7/2010 | Chen .................. G06F 11/1008 365/148 |
| 2010/0274953 A1 | 10/2010 | Lee et al. |

(56) References Cited

U.S. PATENT DOCUMENTS

| | | | |
|---|---|---|---|
| 2011/0211593 A1 | 9/2011 | Pepper | |
| 2011/0320804 A1 | 12/2011 | Chan et al. | |
| 2012/0072683 A1 | 3/2012 | Iliadis | |
| 2012/0082018 A1* | 4/2012 | Gushima | G11B 7/0037 369/44.39 |
| 2012/0110036 A1* | 5/2012 | Rabii | H04N 21/41407 707/822 |
| 2012/0204079 A1 | 8/2012 | Takefman et al. | |
| 2012/0215965 A1 | 8/2012 | Inada et al. | |
| 2012/0254504 A1 | 10/2012 | Syu et al. | |
| 2012/0271990 A1 | 10/2012 | Chen et al. | |
| 2012/0278543 A1 | 11/2012 | Yu et al. | |
| 2013/0013853 A1 | 1/2013 | Yeh | |
| 2013/0019076 A1 | 1/2013 | Amidi et al. | |
| 2013/0086309 A1 | 4/2013 | Lee et al. | |
| 2013/0254456 A1 | 9/2013 | Chen et al. | |
| 2013/0254497 A1 | 9/2013 | Chen et al. | |
| 2013/0286737 A1 | 10/2013 | Im | |
| 2013/0346671 A1 | 12/2013 | Michael et al. | |
| 2014/0059170 A1 | 2/2014 | Gasparakis et al. | |
| 2014/0108702 A1 | 4/2014 | Mizushima | |
| 2014/0156919 A1 | 6/2014 | Chen et al. | |
| 2014/0156920 A1 | 6/2014 | Chen et al. | |
| 2014/0189202 A1* | 7/2014 | Hosaka | G06F 3/0616 711/103 |
| 2014/0223068 A1 | 8/2014 | Shaeffer et al. | |
| 2014/0229669 A1 | 8/2014 | Sandstrom | |
| 2014/0244923 A1 | 8/2014 | Ware | |
| 2014/0269088 A1 | 9/2014 | Pichen | |
| 2015/0003175 A1* | 1/2015 | Ramanujan | G11C 14/0009 365/189.17 |
| 2015/0052114 A1 | 2/2015 | Curewitz | |

FOREIGN PATENT DOCUMENTS

| | | |
|---|---|---|
| CN | 102723099 A | 10/2012 |
| EP | 0428330 A2 | 5/1991 |
| EP | 2737383 A2 | 6/2014 |
| WO | WO2008/139441 A2 | 11/2008 |
| WO | WO 2012/148812 A2 | 11/2012 |
| WO | WO2013016723 A3 | 1/2013 |

OTHER PUBLICATIONS

International Search Report and Written Opinion in PCT/US12/48750, dated Oct. 10, 2012.
Notice of Allowance in U.S. Appl. No. 12/240,916, dated Sep. 17, 2012.
Office Action in U.S. Appl. No. 12/240,916, dated Feb. 1, 2012.
Office Action in U.S. Appl. No. 12/240,916, dated Jul. 29, 2011.
Notice of Allowance in U.S. Appl. No. 13/536,176, dated Aug. 4, 2014.
Amendment and Reply to Office Action in U.S. Appl. No. 13/536,173, dated May 21, 2013.
Notice of Allowance in U.S. Appl. No. 13/536,173, dated Jul. 2, 2013.
U.S. District Court Northern District of California, Case No. 4:13-CV-05889-YGR, *Netlist, Inc.* v. *Smart Storage Systems, Inc., and Diablo Technologies, Inc.*, Smart Storage Systems, Inc.'s Invalidity Contentions, dated Jun. 6, 2014.
U.S. District Court Northern District of California, Case No. 4:13-CV-05889-YGR, *Netlist, Inc.* v. *Smart Storage Systems, Inc., and Diablo Technologies, Inc.*, Exhibit H to "Smart Storage Systems, Inc.'s Invalidity Contentions," dated Jun. 6, 2014.
U.S. District Court Northern District of California, Case No. 4:13-CV-05889-YGR, *Netlist, Inc.* v. *Smart Storage Systems, Inc., and Diablo Technologies, Inc.*, Exhibit H to "Diablo Technologies, Inc.'s Invalidity Contentions," dated Jun. 6, 2014.
Inter Partes Review Case No. IPR2014-01370, Exhibit 2001 to Petition for Inter Partes Review, "Webster's II New College Dictionary," filed on Aug. 23, 2014.
Inter Partes Review Case No. IPR2014-01371, Exhibit 1010 to Petition for Inter Partes Review, "MPC8560 PowerQUICC III Compact Flash Interface Design," Freescale Semiconductor Application Note, Dec. 2006, filed Aug. 23, 2014.
Advisory Action in U.S. Appl. No. 12/240,916, dated Mar. 13, 2012.
Office Action in U.S. Appl. No. 12/240,916, dated Apr. 3, 2012.
Office Action in U.S. Appl. No. 13/536,173, dated Apr. 15, 2013.
Office Action in U.S. Appl. No. 13/905,048, dated Aug. 1, 2013.
Notice of Allowance in U.S. Appl. No. 13/559,476, dated May 6, 2014.
International Preliminary Report on Patentability in PCTIUS12/48750, dated Apr. 3, 2014.
Office Action in U.S. Appl. No. 13/625,563, dated Aug. 5, 2013.
Office Action in U.S. Appl. No. 13/625,563, dated May 9, 2014.
Office Action in U.S. Appl. No. 13/905,053, dated Aug. 1, 2013.
Office Action in U.S. Appl. No. 14/173,219, dated Mar. 13, 2014.
Office Action in U.S. Appl. No. 14/173,242, dated Mar. 14, 2014.
Diablo Technologies, Inc.'s Invalidity Contentions, Case No. 13-CV-05889 YGR, dated Jun. 6, 2014.
Notice of Allowance in U.S. Appl. No. 14/489,269, dated Oct. 8, 2015.
Inter partes review Case No. IPR2017-00649, Exhibit 1010 "JEDEC Standard", filed Jan. 13, 2017.
Inter partes review Case No. IPR2017-00649, Exhibit 1012 "1.8 Volt Intel StrataFlash Wireless Memory (L18)", filed Jan. 13, 2017.
Inter partes review Case No. IPR2017-00649, Exhibit 1003 "Declaration of Ron Maltiel Regarding U.S. Pat. No. 8,301,833", filed Jan. 13, 2017.
Inter partes review Case No. IPR2017-00649, Exhibit 1017 "Computer Organization & Design", filed Jan. 13, 2017.
Inter partes review Case No. IPR2017-00649, Exhibit 1023 "Designing Embedded Hardware", filed Jan. 13, 2017.
Inter partes review Case No. IPR2017-00649, Exhibit 1014 "JEDEC Standard Double Data Rate (DDR) SDRAM Specification JESD79", filed Jan. 13, 2017.
Inter partes review Case No. IPR2017-00649, Exhibit 1020 "Microsoft Computer Dictionary Fifth Edition", filed Jan. 13, 2017.
Inter partes review Case No. IPR2017-00649, Exhibit 1021 "Microsoft Windows 2000 Professional Resource Kit", filed Jan. 13, 2017.
Inter partes review Case No. IPR2017-00649, Exhibit 1024 "A 1.8-V 128-Mb 125-MHz Multilevel Cell Flash Memory With Flexible Read While Write", filed Jan. 13, 2017.
Inter partes review Case No. IPR2017-00649, Petition for Inter Partes Review of U.S. Patent No. 8,301,833 filed Jan. 13, 2017.
Inter partes review Case No. IPR2017-00692, Exhibit 1003 "Declaration of Ron Maltiel Regarding U.S. Pat. No. 8,874,831", filed Jan. 17, 2017.
Inter partes review Case No. IPR2017-00692, Petition for Inter Partes Review of U.S. Patent No. 8,874,831, filed Jan. 17, 2017.
Inter partes review Case No. IPR2017-00649, Exhibit 1006 "U.S. Appl. No. 60/749,267", filed Jan. 13, 2017.
Inter partes review Case No. IPR2017-00692, Exhibit 1007 "U.S. Appl. No. 60/912,321", filed Jan. 17, 2017.
Inter partes review Case No. IPR2017-00692, Exhibit 1005 "U.S. Appl. No. 60/941,586", filed Jan. 17, 2017.
Lee, Final Office Action, U.S. Appl. No. 14/706,873, dated Mar. 21, 2018, 34 pgs.
Lee, Notice of Allowance, U.S. Appl. No. 14/706,873, dated Sep. 24, 2018, 9 pgs.
Lee, Final Office Action, U.S. Appl. No. 14/834,395, dated May 22, 2018, 27 pgs.
Lee, Final Office Action, U.S. Appl. No. 14/834,395, dated Jul. 25, 2017, 22 pgs.
Lee, Office Action, U.S. Appl. No. 15/665,246, dated Jun. 28, 2018, 16 pgs.
Lee, Notice of Allowance, U.S. Appl. No. 15/665,246, dated Nov. 14, 2018, 9 pgs.
Micron Technology Inc., NAND Flash Memory, data sheet, © 2005, 58 pgs.
Netlist, Inc., Communication Pursuant to Article 94(3), EP14860330-1, dated Apr. 19, 2018, 8 pgs.
Netlist, Inc., Extended European Search Report, EP14860330-1, dated Jun. 30. 2017, 16 gs.

(56) References Cited

OTHER PUBLICATIONS

Netlist, Inc., International Search Report and Written Opinion, PCT/US2016/026874, dated Aug. 12, 2016, 9 pgs.
Netlist, Inc., International Preliminary Report on Patentability, PCT/US2016/026874, dated Oct. 24, 2017, 8 pgs.
Netlist, Inc., Office Action, CN201480060643.3, dated Jul. 23, 2018, 17 pgs.
Inter Partes Review of U.S. Pat. No. 8,874,831, Case No. IPR2017-00692, Exhibit 1017 "JESD79-2B", filed Jan. 17, 2017.
Inter Partes Review of U.S. Pat. No. 8,874,831, Case No. IPR2017-00692, Patent Owner's Preliminary Response, filed May 1, 2017.
Inter Partes Review of U.S. Pat. No. 8,874,831, Case No. IPR2017-00692, Exhibit 2001, Excerpts from Microsoft Dictionary Fifth Edition (2002), filed May 1, 2017.
Inter Partes Review of U.S. Pat. No. 8,874,831, Case No. IPR2017-00692, Exhibit 2002, Excerpts from the New: lxford Dictionary Second Edition (2005), filed May 1, 2017.
Inter Partes Review of U.S. Pat. No. 8,874,831, Case No. IPR2017-00692, Exhibit 2003, Excerpts from Merriam-Nebster's Collegiate Dictionary Eleventh Edition (2003), filed May 1, 2017.
Inter Partes Review of U.S. Pat. No. 8,874,831, Case No. IPR2017-00692, Trial Instituted Document, filed Jul. 21, 2017.
Inter Partes Review of U.S. Pat. No. 8,874,831, Case No. IPR2017-00692, Patent Owner's Objections to Evidence, riled Aug. 4, 2017.
Inter Partes Review of U.S. Pat. No. 8,874,831, Case No. IPR2017-00692, Patent Owner's Notice of Deposition of Ron Malliel, filed Aug. 30, 2017.
Inter Partes Review of U.S. Pat. No. 8,874,831, Case No. IPR2017-00692, Patent Owner's Response, Filed Nov. 10, 2017.
Inter Partes Review of U.S. Pat. No. 8,874,831, Case No. IPR2017-00692, Exhibit 2005 Excerpts from Memory Systems {Jacob), Filed Nov. 10, 2017.
Inter Partes Review of U.S. Pat. No. 8,874,831, Case No. IPR2017-00692, Exhibit 2010 Deposition transcript of Ron Malliel, Filed Nov. 10, 2017.
Inter Partes Review of U.S. Pat. No. 8,874,831, Case No. IPR2017-00692, Exhibit 2011 Stanford's Materials Science department website, Filed Nov. 10, 2017.
Inter Partes Review of U.S. Pat. No. 8,874,831, Case No. IPR2017-00692, Exhibit 2012 Webpage from Ben-Gurion University's Materials Science department website, Filed Nov. 10, 2017.
Inter Partes Review of U.S. Pat. No. 8,874,831, Case No. IPR2017-00692, Exhibhit 2013 Search on Amazon, website for "memory module", Filed Nov. 10, 2017.
Inter Partes Review of U.S. Pat. No. 8,874,831, Case No. IPR2017-00692, Exhibit 2014 Kingston press release from Oct. 11, 2005, Filed Nov. 10, 2017.
Inter Partes Review of U.S. Pat. No. 8,874,831, Case No. IPR2017-00692, Exhibit 2015 Decision of the U.S. Court of Appeals Case No. 2016-1742, Filed Nov. 10, 2017.
Inter Partes Review of U.S. Pat. No. 8,874,831, Case No. IPR2017-00692, Exhibit 2019 IPR2017-00649, paper 7, denying institution, filed Nov. 10, 2017.
Inter Partes Review of U.S. Pat. No. 8,874,831, Case No. IPR2017-00692, Exhibit 2020 IPR2017-00649, paper 8, rehearing request, Filed Nov. 10, 2017.
Inter Partes Review of U.S. Pat. No. 8,874,831, Case No. IPR2017-00692, Exhibit 2021 IPR2014-00882, Paper 33, FWD, Filed Nov. 10, 2017.
Inter Partes Review of U.S. Pat. No. 8,874,831, Case No. IPR2017-00692, Exhibit 2022 JEDEC Standard, JESD20c 2007), Filed Nov. 10, 2017.
Inter Partes Review of U.S. Pat. No. 8,874,831, Case No. IPR2017-00692, Exhibit 2023 Deposition transcript of Dr. Mazumder {IPR2017-00560, -561, -562), Filed Nov. 10, 2017.
Inter Partes Review of U.S. Pat. No. 8,874,831, Case No. IPR2017-00692, Exhibit 2024 M-Systems DiskOnChip Millennium Plus Data Sheet, Filed Nov. 10, 2017.
Inter Partes Review of U.S. Pat. No. 8,874,831, Case No. IPR2017-00692, Exhibit 2025 Excerpts from Merriam-Webster's (2006), Filed Nov. 10, 2017.
Inter Partes Review of U.S. Pat. No. 8,874,831, Case No. IPR2017-00692, Exhibit 2026 Excerpts from Memory Systems {Jacob), Filed Nov. 10, 2017.
Inter Partes Review of U.S. Pat. No. 8,874,831, Case No. IPR2017-00692, Petitioners Objections to Evidence, Filed Nov. 17, 2017.
U.S. District Court Northern District of California, Case No. 4:13-CV-05889-YGR, *Netlist, Inc. v. Smart Storage Systems, Inc., and Diablo Technologies, Inc.*, Smart Storage Systems, lnc.'s Invalidity Contentions, dated Jun. 6, 2014.
U.S. District Court Northern District of California, Case No. 4:13-CV-05889-YGR, *Netlist, Inc. v. Smart Storage Systems, Inc., and Diablo Technologies, Inc.*, Exhibits C.1-C.7 to "Smart Storage Systems, Inc.'s Invalidity Contentions," dated Jun. 6, 2014.
U.S. District Court Northern District of California, Case No. 4:13-CV-05889-YGR, *Netlist, Inc. v. Smart Storage Systems, Inc., and Diablo Technologies, Inc.*, Exhibits D.1-D.8 to "Smart Storage Systems, Inc.'s Invalidity Contentions," dated Jun. 6, 2014.
U.S. District Court Northern District of California, Case No. 4:13-CV-05889-YGR, *Netlist, Inc. v. Smart Storage Systems, Inc., and Diablo Technologies, Inc.*, Diablo Technologies, Inc.'s Invalidity Contentions, dated Jun. 6, 2014.
U.S. District Court Northern District of California, Case No. 4:13-CV-05889-YGR, *Netlist, Inc. v. Smart Storage Systems, Inc., and Diablo Technologies, Inc.*, Exhibits E-1 to E-7 to "Diablo Technologies, Inc.'s Invalidity Contentions," dated Jun. 6, 2014.
U.S. District Court Northern District of California, Case No. 4:13-CV-05889-YGR, *Netlist, Inc. v. Smart Storage Systems, Inc., and Diablo Technologies, Inc.*, Exhibits B-1 to B-7 to "Diablo Technologies, Inc.'s Invalidity Contentions," dated Jun. 6, 2014.
U.S. District Court Northern District of California, Case No. 4:13-CV-05889-YGR, *Netlist, Inc. v. Smart Storage Systems, Inc., and Diablo Technologies, Inc.*, Exhibit H to "Diablo Technologies, lnc.'s Invalidity Contentions," dated Jun. 6, 2014.
Inter Partes Review U.S. Pat. No. 8,301,833, IPR Case No. IPR2014-01370, Corrected Petition for Inter Partes Review, filed on Sep. 22, 2014.
Inter Partes Review Case No. IPR2014-01370, Exhibit 1002 to Petition for Inter Partes Review, "Declaration of Dr. Nader Bagherzadah," filed on Aug. 23, 2014.
Inter Partes Review Case No. IPR2014-01370, Exhibit 1017 "Webster's II New College Dictionary," filed on Sep. 22, 2014.
Inter Partes Review Case No. IPR2014-01370, Patent Owner's Preliminary Response, filed on Dec. 18, 2014.
Inter Partes Review Case No. IPR2014-01370, Patent Owner's Exhibit List, filed on Dec. 18, 2014.
Inter Partes Review Case No. IPR2014-01370, Decision—Denying Institution of Inter Partes Review 37 C.F.R. 42.108, issued Mar. 13, 2015.
Inter Partes Review Case No. IPR2014-01370, Exhibit 2002 to Petition for Inter Partes Review, "Standard Dictionary of Electrical and Electronics Terms," IEEE 1988, filed on Aug. 23, 2014.
Inter Partes Review of U.S. Pat. No. 8,516,187, IPR Case No. IPR2014-01371, Corrected Petition for Inter Partes Review, filed on Sep. 22, 2014.
Inter Partes Review Case No. IPR2014-01371, Exhibit 1005 to Petition for Inter Partes Review, "The BIOS Optimization Guide Rev. 6.2," Adrian Wong 1988, filed on Aug. 23, 2014.
Inter Partes Review Case No. IPR2014-01371, Exhibit 1006 to Petition for Inter Partes Review, "JEDEC Standard No. 21-C Release 9," JEDEC Solid State Technology Association, Aug. 1999, filed Aug. 23, 2014.
Inter Partes Review Case No. IPR2014-01371, Exhibit 1010 to Petition for Inter Partes Review, "MPC8560 PowerQUICC Ill Compact Flash Interface Design," Freescale Semiconductor Application Note, Dec. 2006, filed Aug. 23, 2014.
Inter Partes Review Case No. IPR2014-01371, Patent Owner's Preliminary Response, filed on Dec. 18, 2014.
Inter Partes Review Case No. IPR2014-01371, Patent Owner's Exhibit List, filed on Dec. 18, 2014.

(56) References Cited

OTHER PUBLICATIONS

Inter Partes Review Case No. IPR2014-01371, Decision—Denying Institution of Inter Partes Review 37 C.F.R. 42.108, issued on Mar. 13, 2015.
JEDEC Global Standards for the Microelectronics Industry, Standards http://www.jedec.org/standards-documents/about-jedec- standards (2014).
JEDEC Standard No. 21-C (Release 17), Annex J: Serial Presence Detects for DDR2 SDRAM (Rev. 1.3).
Inter Partes Review Case No. IPR2014-00982, Petition for Inter Partes Review of U.S. Pat. No. 8,516,187, filed on Jun. 19, 2014.
Inter Partes Review Case No. IPR2014-00982, Patent Owner's Preliminary Response, filed Sep. 26, 2014.
Inter Partes Review Case No. IPR2014-00982, Decision—Denying Institution of Inter Partes Review 37 C.F.R. 42.108, issued Dec. 22, 2014.
Inter Partes Review Case No. IPR2014-00982, Rehearing Request, filed Jan. 15, 2015.
Inter Partes Review Case No. IPR2014-00982, Decision Denying Request for Rehearing, issued May 21, 2015.
Inter Partes Review Case No. IPR2014-00982, Exhibit 1013 to Petition for Inter Partes Review, "Declaration of Dr. Paul Min," filed on Jun. 19, 2014.
Inter Partes Review of U.S. Pat. No. 8,516,187, IPR Case No. IPR2014-00994, Petition for Inter Partes Review, filed on Jun. 20, 2014.
Inter Partes Review Case No. IPR2014-00994, Patent Owner's Preliminary Response, filed on Oct. 2, 2014.
Inter Partes Review Case No. IPR2014-00994, Decision—Denying Institution of Inter Partes Review—37 CFR 42.108, issued Dec. 16, 2014.
Inter Partes Review Case No. IPR2014-00994, Rehearing Request, filed on Jan. 15, 2015.
Inter Partes Review Case No. IPR2014-00994, Decision Denying Request for Rehearing, issued May 21, 2015.
JEDEC Standard 21-C, "Configurations for Solid State Memories," pp. 4.5.5-1 to 4.5.5-18.
Diablo Technologies, Inc.'s Invalidity Contentions, Case No. 13-CV-05889 YGR, dated Jun. 6, 2014.
Smart Storage Systems, Inc's Invalidity Contentions, Case No. 4:13-cv-05889-YGR, dated Jun. 6, 2014.
JEDEC Standard, "Configurations for Solid State Memories", JEDEC Standard 21-C, Release 9, Aug. 1999,114 pages.
Wong, A. "The BIOS Optimization Guide", Adrian's Rojak Pot, Rev. 6.2, 1998-2001, 67 pages.
American National Standard Dictionary of Electrical and Electrical Terms, IEEE, Fourth Edition, Revised, ANSIIEEE Std 100-1988, Institute of Electrical Engineers, Nov. 3, 1988, pp. 215, 722, 964 and 1103.
Webster's II New College Dictionary, Houghton Mifflin Company, Boston, MA, 2001, pp. 259, 1115.
Bruce, J., "Synchronous DRAM Architectures, Organizations, and Alternate Technologies", Electrical and Computer Engineering Dept., Univ. of Maryland, Dec. 10, 2002, 22 pages.
David, H. et al., "Fully Buffered DIMM (FB-DIMM) Design Considerations", Intel Developer Forum, Intel Corp., Feb. 18, 2004, 36 pages.
Horowitz, P. et al., "The Art of Electronics", Cambridge University Press 2nd Ed. 1989, pp. 471,495-496.
Innis, J., "MPC8560 PowerQUICC III Compact Flash Interface Design", Freescale Semiconductor, Inc., 2004-2006, pp. 1-23.
Jacob, B., "Memory Systems Cache, RAM, Disk", Morgan Kaufman Publishers, Burlington, MA, 2008, Preface and Ch. 7 pp. 315-322.
Jandhyala, S. et al., "Design-For-Test Analysis of a Buffered SDRAMIMM", Semiconductor Group, Texas Instruments, Proceedings of International Workshop in Memory Technology, Design and Testing, Singapore, Aug. 13014, 1996,15 pages.
JEDEC Standard, Double Data Rate (DDR): SDRAM Specification: JESD79C (Revision JESD79B), Mar. 2003, pp. 1-75.
JEDEC Standard, FBDIMM Specification:DR2 SDRAM Fully Buffered DIMM (FBDIMM) Design Specification: JESD205, JEDEC Solid State Tech. Assoc., Mar. 2007, pp. 1-129.
Mutnuary, B. et al., "Analysis of Fully Buffered DIMM Interface in High-speed Server Applications", IBM Corp, xSeries eServer Development, 2006 Electronic Components and Technology Conference, pp. 203-208.
Petition for Inter Partes Review of U.S. Pat. No. 8,516,187 (on behalf of SanDisk, Corp.), filed Jun. 19, 2014.
Petition for Inter Partes Review of U.S. Pat. No. 8,301,833 (on behalf of SanDisk, Corp.), filed Jun. 20, 2014.
"Using Two Chip Selects to Enable Quad Rank", an IP.com Prior Art Database Technical Disclosure, IP.com Electronic Publication: Dec. 17, 2005, 2 pages.
Petition for Inter Partes Review of U.S. Pat. No. 8,516,187 (on behalf of SMART Modular Technologies, Inc.), filed Aug. 22, 2014.
Petition for Inter Partes Review of U.S. Pat. No. 8,301,833 (on behalf of SMART Modular Technologies, Inc.), filed Aug. 22, 2014.
"Out of Stealth Mode, Start-Up MetaRAM Unveils New Technology That Quadruples DRAM Capacity", Press Release edited by Storage Newsletter on Feb. 28, 2008 at StorageNewsLetler.com, 8 pages.
"MetaRAM Develops New Technology That Quadruples Memory Capacity of Servers and Workstations; Reduces Price by Up to 90 Percent", Press Release provided by MetaRAM and published on MarketWired.com, Feb. 25, 2008, 3 pages.
"240pin DDR2 MetaSDRAM Registered DIMM based on 1 GB version C", Hynix Semiconductor, Product Description Rev. 0.2, Sep. 2008, 32 pages.
Lee, Office Action, U.S. Appl. No. 14/834,395, dated Jan. 4, 2019, 33 pgs.

* cited by examiner

Address Spaces Provided by the HVDIMMs

| Disk ID | DIMM ID | DRAM Address Range | | Flash Address Range | |
|---|---|---|---|---|---|
| | | Min | Max | Min | Max |
| K1 | HVDIMM 1 | abc | def | αβχ | δεφ |
| K2 | HVDIMM 2 | ghi | jkl | γηι | φκλ |
| K3 | HVDIMM 3 | mno | pqr | μνο | πθρ |
| ...... | ...... | ...... | ...... | ...... | ...... |
| K24 | HVDIMM 24 | stu | vwx | στυ | ϖωξ |

FIG. 10

HYBRID MEMORY MODULE AND SYSTEM AND METHOD OF OPERATING THE SAME

CROSS REFERENCE TO RELATED APPLICATIONS

The present application claims priority to U.S. Provisional Patent Application No. 61/901,439, filed Nov. 7, 2013, entitled "Dynamic Random Access to Non-Volatile Memory," U.S. Provisional Patent Application No. 61/929,942, filed Jan. 21, 2014, entitled "Memory Channel Storage," U.S. Provisional Patent Application No. 62/041,024, filed Aug. 22, 2014, entitled "Apparatus and Methods for Transferring Storage Content," U.S. Provisional Patent Application No. 62/056,469, filed Sep. 26, 2014, entitled "Memory Channel Storage," and U.S. Provisional Patent Application No. 62/067,411, filed Oct. 22, 2014, entitled "Hybrid Mobile Memory for Random Access," each of which is incorporated herein by reference in its entirety. The present application is related to U.S. Provisional Patent Application No. 61/512,871, filed Jul. 28, 2011, entitled "High Density DIMMs," and U.S. patent application Ser. No. 13/559,476, filed Jul. 26, 2012, entitled "Flash DRAM Hybrid Memory Module," each of which is incorporated herein by reference in its entirety. The present application further claims priority to U.S. Provisional Patent Application No. 61/989,941, filed May 7, 2014, entitled "High Density Hybrid Memory Systems."

FIELD

The disclosure herein is related generally to memory modules, and more particularly to hybrid memory modules having both volatile and non-volatile subsystems, and system and method of operating the same.

BACKGROUND

Computer systems such as network servers, personal computers, PDAs, mobile phones, video games, scientific instrumentation, industrial robotics, medical electronics, and so on, rely heavily on the capacity and throughput of their system or main memories and the speed of accessing them for optimal performance. Currently, dynamic random-access memory (DRAM) is commonly used as system memory. DRAM is a type of random-access memory that stores each bit of data in a separate capacitor in an integrated circuit. The capacitor can be either charged or discharged so that these two states are taken to represent the two values of a bit, conventionally called 0 and 1. Since capacitors leak charge, the information eventually fades unless the capacitor charge is refreshed periodically. Because of this refresh requirement, it is a dynamic memory as opposed to SRAM and other static memory.

The structural simplicity of DRAM allows DRAM chips to reach very high densities, because billions of transistor and capacitor pairs can fit on a single memory chip. On the other hand, DRAM is volatile memory—it loses its data quickly when power is removed. Compared to Flash memory, which is a type of electronic non-volatile computer storage medium that can be electrically erased and reprogrammed, DRAM is also much more expensive. For example, high density DRAM can cost as much as 10 times more than high-performance Flash devices. Furthermore, Flash chips can have much higher density than DRAM chips, allowing a same-sized memory module to pack much more to reach a much larger memory capacity.

There are two main types of Flash memory, the NAND type and the NOR type, which are named after the NAND and NOR logic gates. The NOR type allows a single machine word (byte) to be written or read independently. NAND type Flash memory may be written and read in blocks (or pages), which are generally much smaller than the entire device. NAND Flash also has reduced erase and write times, and requires less chip area per cell, thus allowing greater storage density and lower cost per bit than NOR Flash. Moreover, NAND Flash also has up to ten times the endurance of NOR Flash. Thus, NAND Flash has been more widely used than NOR Flash.

Besides its advantages, Flash memory also has certain limitations, which pose many challenges to make it useful as main memory. One limitation of Flash memory, especially NAND Flash, is that it can only be erased a "block" at a time. Erasing a block generally sets all bits in the block to 1. Starting with a freshly erased block, any location within that block can be programmed a byte or a word at a time in a random access fashion. However, once a bit has been set to 0, only by erasing the entire block can it be changed back to 1. In other words, Flash memory does not offer arbitrary random-access rewrite or erase operations.

Another limitation is that Flash memory has a finite number of program-erase cycles (typically written as P/E cycles). Most commercially available Flash products are guaranteed to withstand around a certain number of cycles (e.g., 100,000 P/E cycles) before the wear begins to deteriorate the integrity of the storage. Some chip firmware or file system drivers perform the so-called wear leveling technique by counting the writes and dynamically remapping blocks in order to spread write operations between sectors. For portable consumer devices, these wear-out management techniques typically extend the life of the Flash memory beyond the life of the device itself, and some data loss may be acceptable in these applications. For high reliability data storage, however, it is not advisable to use Flash memory that would have to go through a large number of programming cycles.

BRIEF DESCRIPTION OF THE DRAWINGS

FIG. 10 is diagram illustrating a memory association table according to certain embodiments.

DESCRIPTION OF THE EMBODIMENTS

Figure 1:
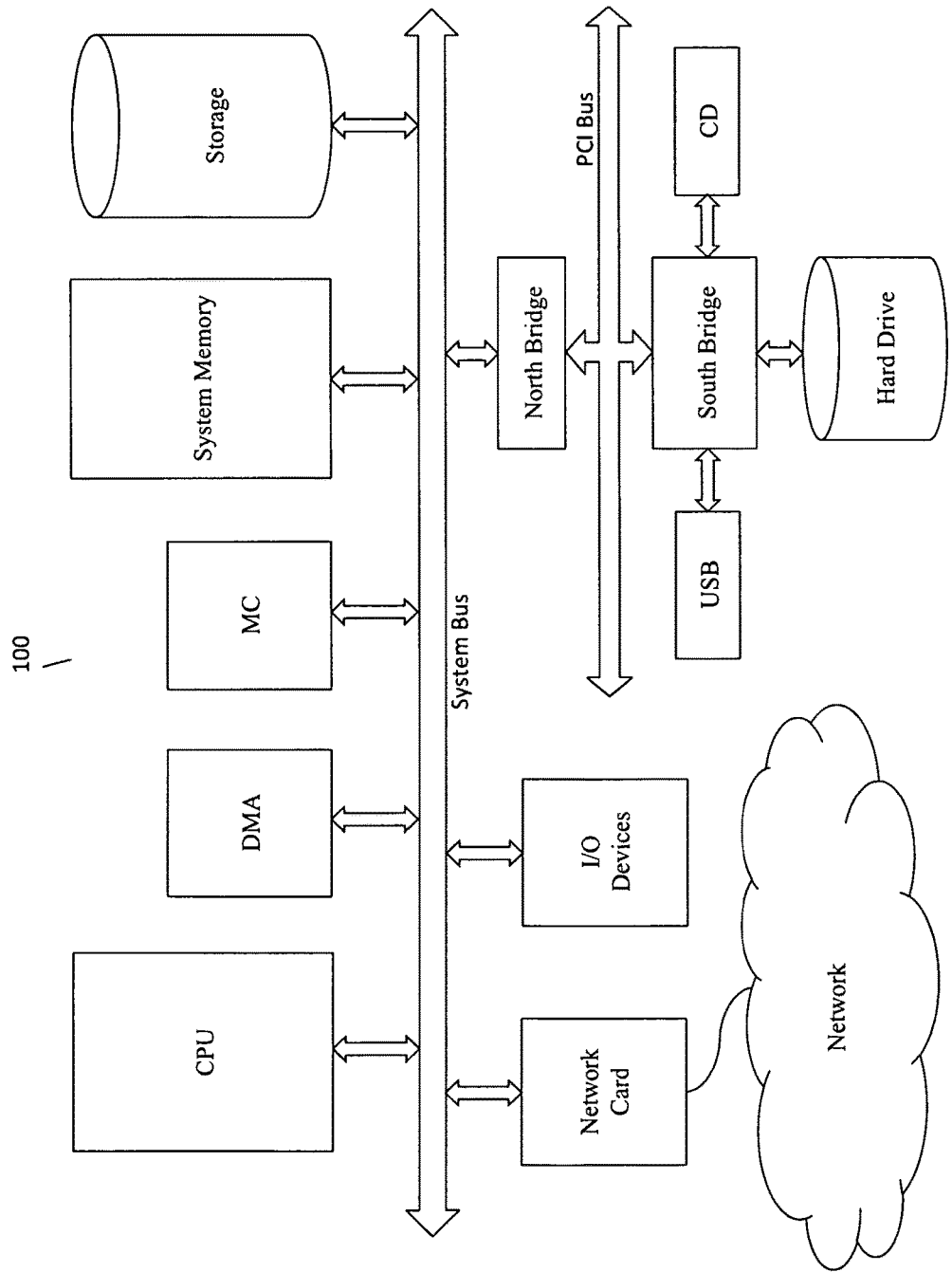
FIG. 1 is a block diagram of a computer or server system according to certain embodiments.

As shown in FIG. 1, a computer or server system (computer system) 100 according to certain embodiments includes a central processing unit (CPU) or processor, a memory controller (MC), and one or more memory modules coupled to a system bus. The one or more memory modules provide a system memory, and may further provide storage. In certain embodiments, the MC may be integrated into the CPU. In further embodiments, the computer system may also include a direct data management controller (DMA) also coupled to the system bus. The CPU with or without the MC and/or the DMA, or the computer system 100 in part or in whole, is sometimes referred to hereafter as the "System" or "system."

In certain embodiments, the computer system 100 may further include a network card and one or more I/O devices such as keyboard, monitor, touchscreen, microphone, speaker, etc. The network card may or may not be integrated into the CPU and provides network interface functions (wired or wireless) between the computer system 100 and local and/or wide area networks. The computer system 100 may further include a PCI bus, which is coupled to the system bus via a north bridge and one or more storage devices, such as a hard drive, a CD/DVD drive, and a USB drive, via a south bridge.

Figure 2:
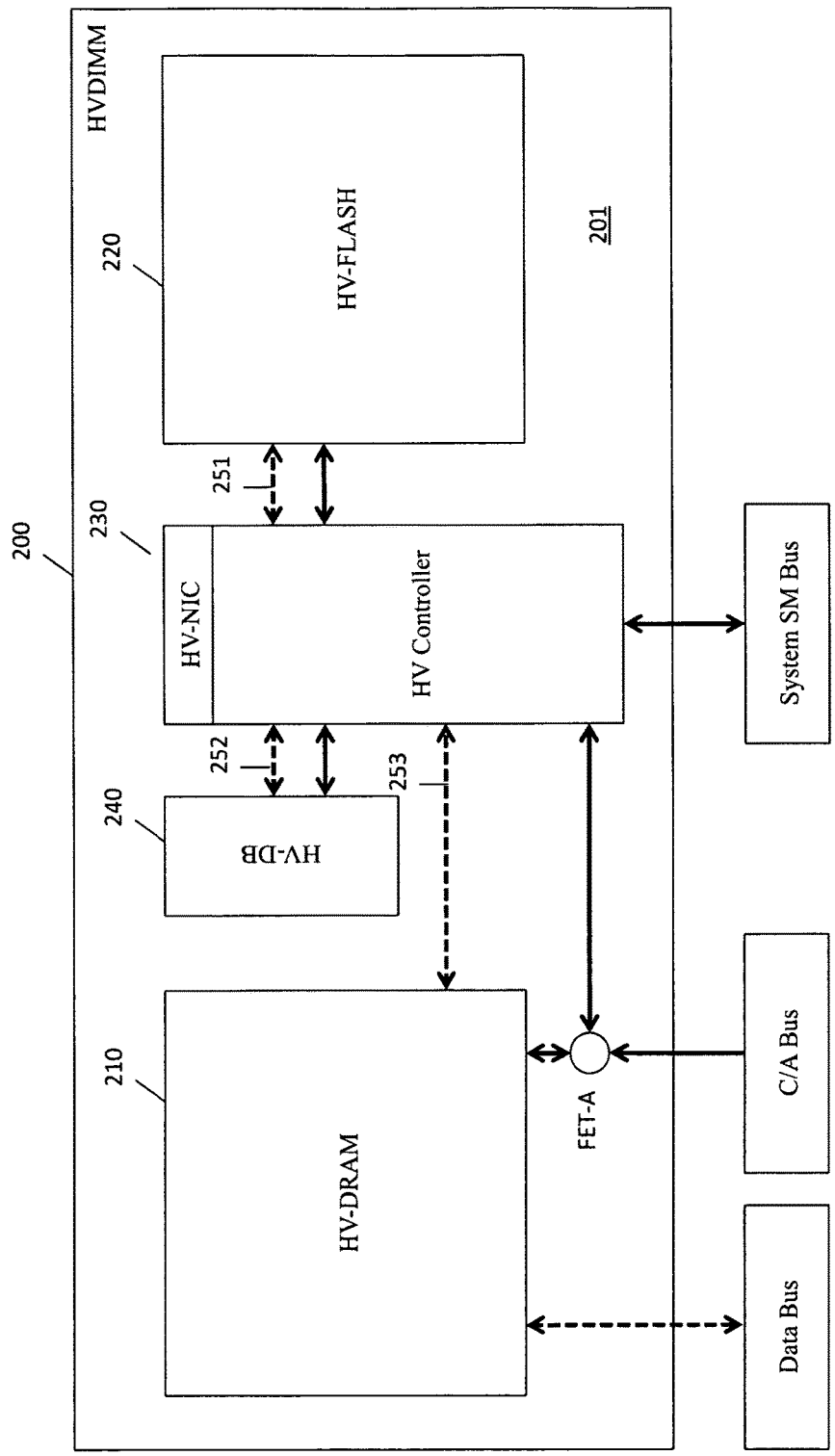
FIG. 2 is a block diagram of a hybrid memory module having a volatile memory subsystem, a non-volatile memory subsystem and a module controller according to certain embodiments.

FIG. 2 is a block diagram of a Hypervault™ dual-in-line memory module (HVDIMM) 200, which can be used to provide the system memory and/or the storage of the computer/server system according to certain embodiments. As shown in FIG. 2, the HVDIMM 200 includes a volatile memory subsystem (HV-DRAM) 210, a non-volatile memory subsystem (HV-Flash 220) 220, and a module control subsystem (HV Controller) 230, mounted on a module board 201, which may include one or more printed circuit boards. The HVDIMM 200 may also include a data buffer (HV-DB), and may also include a network interface controller (HV-NIC). In certain embodiment, the HV-DB 240 includes DRAM memory, such as terabyte DRAM memory (TBM). The HV-DRAM 210 and the HV Controller 230 are coupled to each other, to the system, and to the HV-Flash 220 via data signal lines (as represented by the dashed double-arrow lines) and control/address (C/A) signals lines (as represented by the solid double or single-arrow lines). As shown in FIG. 2, data signal lines 251, 252, and 253, together with the HV Controller 230 and the HV-DB 240, form a dedicated data path between the HV-DRAM 210 and the HV-Flash 220, allowing data to be transferred between the volatile and non-volatile subsystems without going through the memory channel or the CPU. In certain embodiment, the dedicated data path is a high-bandwith data path.

As is also shown in FIG. 2, the HVDIMM 200 further includes switches, FET-A (e.g., Field-effect transistor or FET switches). In certain embodiments, there are two sets of switches in the HVDIMM 200, data switches and command/address switches. These switches do not need to be fast switches but they should support relatively short input to output delay time. In certain embodiments, the signal propagation time for both sets of switches should be a small fraction of a data period (e.g., 200-300 ps), so that the delay time can be hidden from the system.

As shown in FIG. 2, data from the system is directly connected to HV-DRAM 210 data input/output (I/O) (not shown) while the system command/address signals are connected to the HV-DRAM 210 via the FET switches, such that the HV-DRAM 210 either can receive command/address from the system during, for example, normal operations when the system accesses the memory spaces in the HVDIMM 200, or from the HV Controller 230 during, for example, backup/restore operations when the HVDIMM 200 backs up the content in the HV-DRAM after a power failure or restore the content back into the DRAM after power is resumed. The FET switches can be controlled by the HV Controller 230.

In certain embodiments, the HV-Flash 220 includes MLC NAND Flash, which are partitioned to support fast access as well as enhance the error correction capability for virtual duplication. In certain embodiments, the HV-Flash 220 includes, for example, 256 GB/512 GB of main Flash and 32 GB of scratch Flash. The main Flash can serve as a large storage with direct data bus on the HVDIMM 200 to the DRAM. The scratch Flash facilitates a mechanism to prolong the life time of the Flash memory cells in the HV-Flash 220, as described below.

Figure 3:
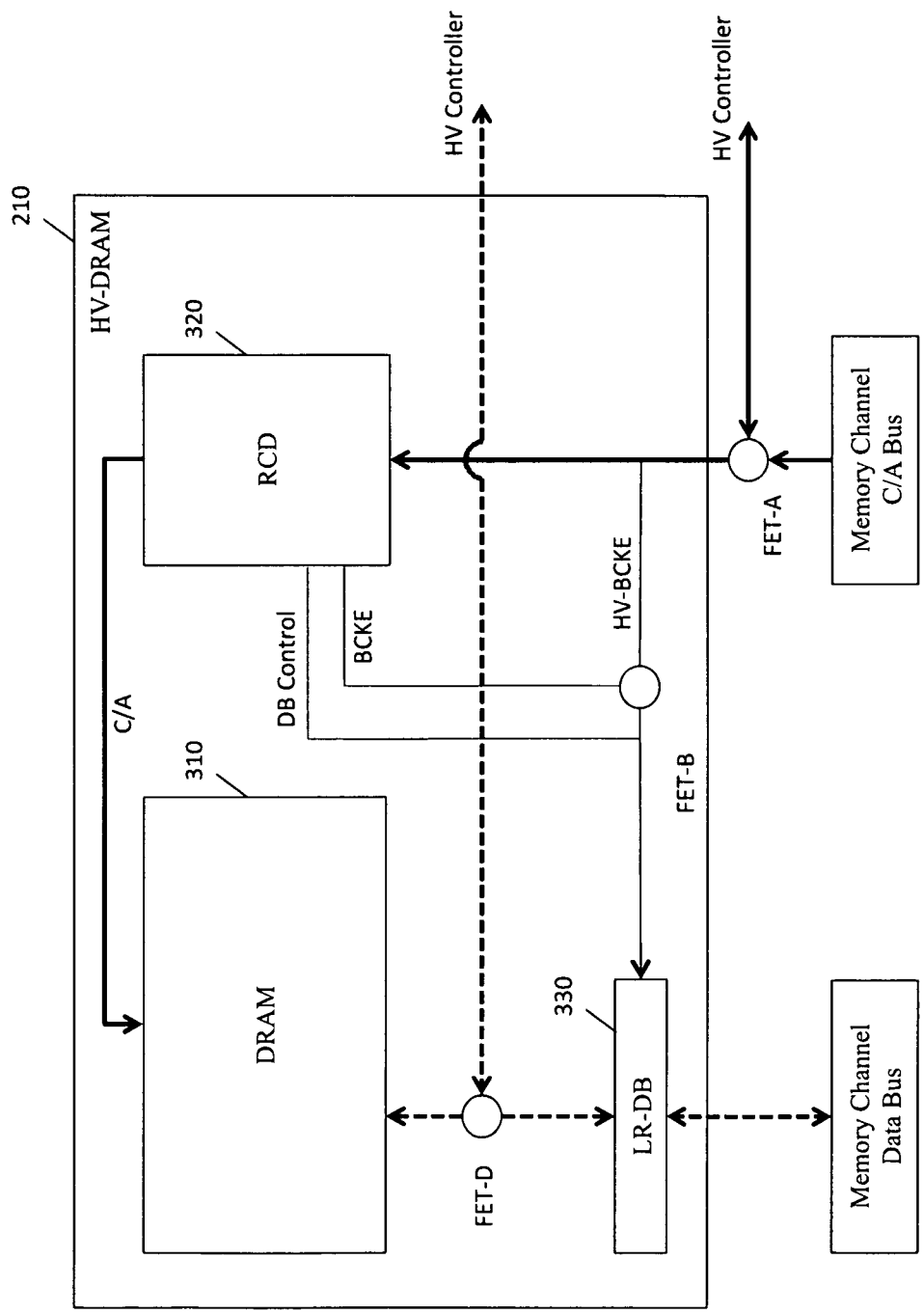
FIG. 3 is a block diagram of the volatile memory subsystem in the hybrid memory module according to certain embodiments.

FIG. 3 is a block diagram of the HV-DRAM 210 subsystem according to certain embodiments. As shown in FIG. 3, the HV-DRAM 210 subsystem includes DRAM devices 310, a registered control device (RCD) or control register 320 to interface with the MC or the HV Controller 230, and load-reduction data buffers (LRDB) 330. In certain embodiment, the RCD 320 can be a standard register, which is a register in compliance with an industry standard, such as the Joint Electron Device Engineering Council Double Data Rate 4 Load Reduction Dual In-Line Memory Module (JEDEC DDR4 LRDIMM) standard, so that the HV-DRAM 210 can be compatible with a standard system memory interface. In certain embodiments, the data transmission circuits described in commonly owned U.S. Pat. No. 8,516,185, which is incorporated herein in its entirety, can be used as the LRDB 330. Although FIG. 3 shows the LRDB 330 as one unit, in practice, the LRDB 330 can include multiple units distributed across the module board 201 and coupled to respective groups of memory devices, as described in U.S. Pat. No. 8,516,185.

In certain embodiments, the HV-DRAM 210 provides main memory functions for the HVDIMM 200 when the HVDIMM 200 is used to provide system memory. In certain embodiments, the HV-DRAM 210 acts as buffer memory for the HV-Flash 220 when the HVDIMM 200 is used to provide storage. In certain embodiments, cache-line-wide reads from the DRAM is mapped to the Flash. There are, however, differences between a standard DRAM module (e.g. JEDEC DDR4 LRDIMM) and the HV-DRAM 210. In certain embodiments, the HV-DRAM 210 may include data switches (FET-D), in addition to the command/address switches (FET-A). The data switch FET-D is coupled between DRAM data buffers (LR-DB) and the DRAM, while the command/address switch FET-A is coupled between the memory channel C/A bus and the RCD 320. The FET switches, FET-A and FET-D, can be controlled by the HV Controller 230 to transition the HVDIMM 200 between different operation modes. In certain embodiments, either or both of these switches, FET-A and FET-D, are not required, and the different modes of operation can be accomplished by tristating the relevant I/Os in the DRAM, the HV Controller 230, and/or the LRDB 330.

Figure 4:
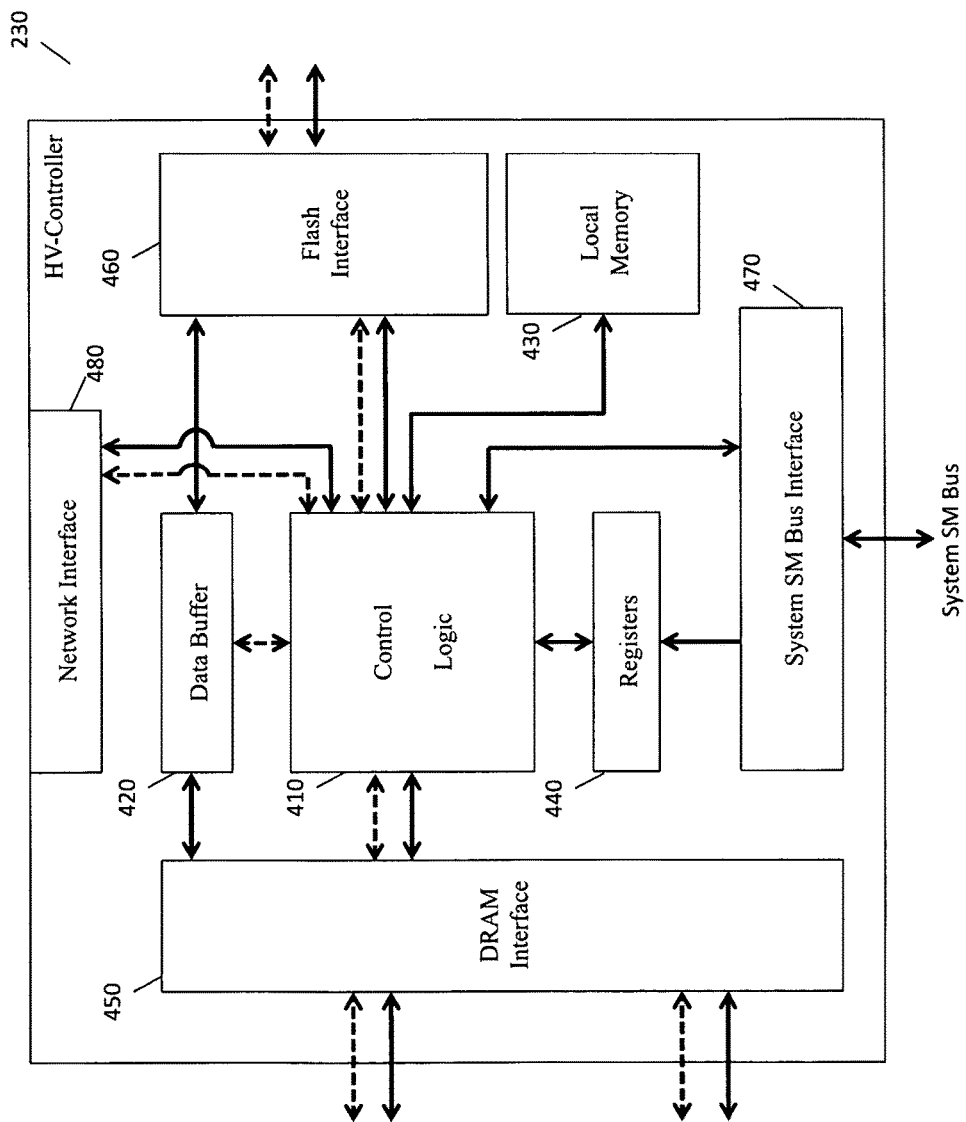
FIG. 4 is a block diagram of the module controller in the hybrid memory module according to certain embodiments.

FIG. 4 is a block diagram of the HV Controller 230, which can include an application-specific integrated circuit (ASIC) device or a programmable field gate array (FPGA) device. As shown in FIG. 4, the HV Controller 230 includes control logic 410, a data buffer 420, local memory 430 and registers 440. The HV Controller 230 further includes a DRAM interface 450, a Flash interface 460, a system management Bus interface 470, and a network interface 480. In certain embodiments, the HV Controller 230 controls data transfers between the HV-DRAM 210 and HV-Flash 220. It keeps an address management table in the local memory on-chip memory space, operates FET switches, and generates proper commands to the HV-Flash 220 and HV-DRAM 210 for data transfers therebetween.

In certain embodiments, the HV Controller 230 also keeps an HVDIMM 200 level bad block table in the local memory and manages the scratch Flash, as discussed below. In certain embodiments, the HV Controller 230 is configured to execute error detection/correction routines to insure the integrity of data stored in the Flash, to perform Flash life extension operations by averaging out the HV-Flash 220 block usage and/or using the scratch Flash to minimize/reduce program/erase operations in the main Flash.

In certain embodiments, the control logic 410 includes logic circuits and may further include one or more processing units to pre-process data being transferred from the Flash to the DRAM, so as to save DRAM memory space and reduce data traffic in the memory channel by off-loading some of the computing work traditionally done by the CPU, as discussed further below.

In certain embodiments, the HVDIMM 200 can be operated to back up data in the DRAM in response to power failure events. The HV Controller 230 provides correct timings for HV-DRAM 210 to be operated in an DLL-off mode when data in the DRAM is being transferred to the Flash. The HV Controller 230 also provides proper operational procedure for the back-up and restore processes. The FET switches, FET-A, can be configured to isolate the RCD 320 and the HV Controller 230 from the C/A bus and to allow the RCD 320 to receive C/A signals from the HV Controller 230 during the back-up and restore processes.

In certain embodiments, the HVDIMM 200 is configured to allow the system to access it via a system management (SM) bus using, for example, the I²C protocol or any other system control bus interface. For example, the system can also use the SM bus to configure the HV Controller 230 by setting certain registers in the HV Controller 230. The HV Controller 230 can also use the SM bus to notify the system when certain operation is completed or when an error is encountered, either using a preconfigured interrupt signal, or by updating a predefined status register in the system bus interface of the HV Controller 230, or in the DMA.

In certain embodiments, the HV Controller 230 also manages network interfaces between the HVDIMM 200 and any local or wide-area networks in conjunction with HV-NIC so as to facilitate direct data transfers between the HVDIMM 200 and other storage devices in the local or wide-area networks. In certain embodiments, the HV Controller 230 includes a network interface and/or is coupled to a network interface card (HV-NIC), which can take the data from the HV-DRAM 210 and/or HV-Flash 220, and constructs network packets with proper source and destination addresses. In general, the source address is preconfigured by the system. In certain embodiments, the HV-NIC or network interface and some or all of the other components of the HV Controller 230 can be embedded into a same ASIC or FPGA.

Figure 5:
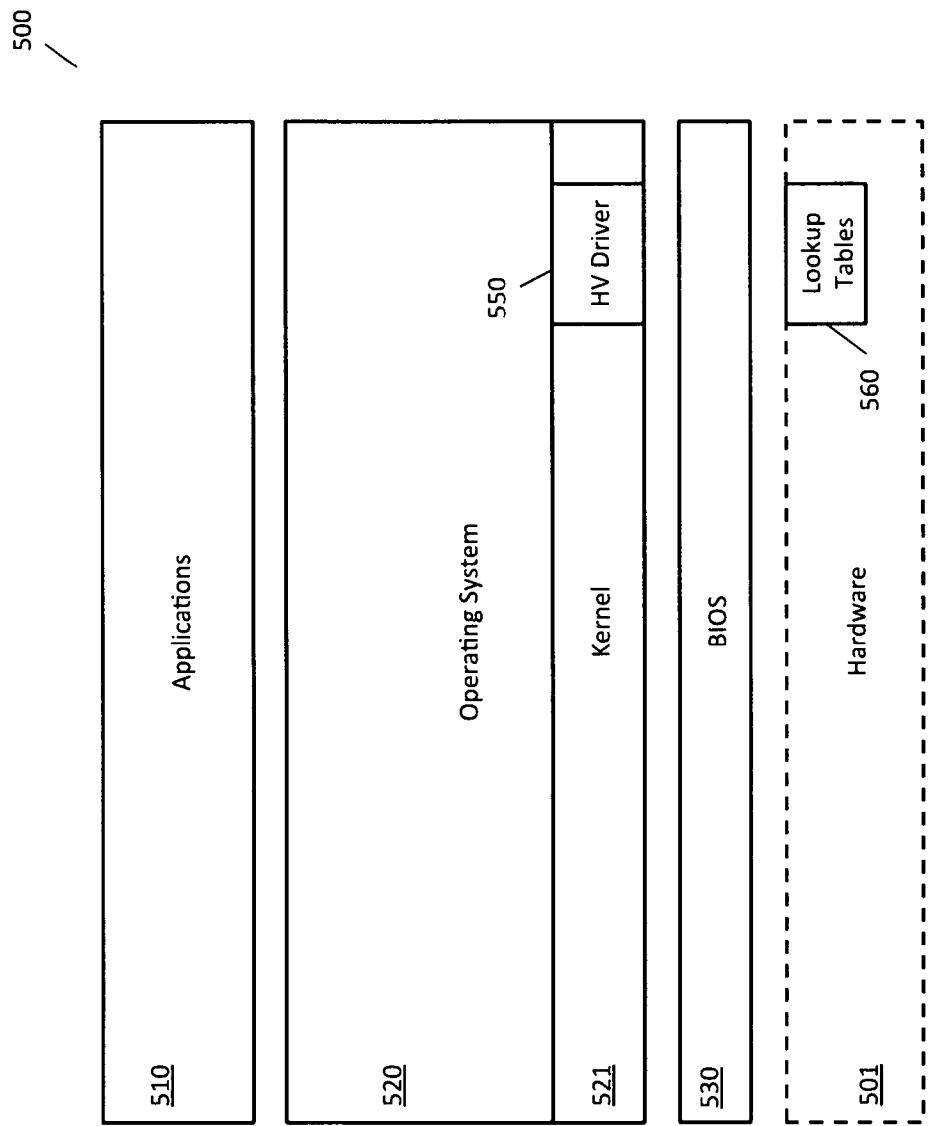
FIG. 5 is a block diagram of a software stack of the computer or server system according to certain embodiments.

In addition to the hardware components shown in FIG. 1, the computer system 100 also includes software/firmware components. In certain embodiments, the software/firmware components can be roughly represented as a stack of software/firmware layers 500 over a hardware layer 501. As shown in FIG. 5, the stack of software/firmware layers include an applications layer 510 sitting on an operating system layer 520. The applications 510 are software programs that perform specific tasks. The operating system 520 manages the hardware and software resources of the computer system 100 and acts as an intermediary between the application programs 510 and the hardware components of the computer system 100.

The operating system 520 includes a kernel 521, which are computer programs that manages input/output requests from other software programs (or processes), and which translates the requests into data processing instructions for the CPU and/or other hardware components of the computer system 100. The kernel can include an interrupt handler that handles all requests or completed I/O operations that compete for the kernel's services, a scheduler that determines which programs share the kernel's processing time in what order, and a supervisor that actually gives use of the computer to each process when it is scheduled. The kernel may also include a manager of the operating system's address spaces in memory or storage. The kernel's services are requested by other parts of the operating system or by applications through a specified set of program interfaces sometimes referred to as system calls.

Between the kernel and the hardware layer is the basic input/output system (BIOS) layer 530, which in certain embodiments is firmware stored in some sort of permanent memory (e.g., programmable read-only memory (PROM), or electrically programmable read-only memory (EPROM)) and includes program codes for initializing and testing the system hardware components, and to load the operating system from a mass memory device when the computer system 100 is boot up. The BIOS may additionally provides an abstraction layer for the hardware components so as to provide a consistent way for application programs and operating systems to interact with the hardware components such as the system memory and input/output devices.

In certain embodiments, the software stack further includes an HV driver 550 in, for example, the kernel. The HV driver 550 is a software program for controlling system access to the HVDIMM 200. Thus, the HVDIMM 200 can operate like a standard DIMM (e.g., DDR4 LRDIMM) without requiring any changes to the BIOS. The HV driver 550 has access to a memory space 560 in the CPU or one or more other memory devices in the computer/server system, which is used to store lookup tables or other configuration information, and which the HV driver 550 can consult with and/or update as needed. In certain embodiments, the driver intercepts system calls to access the HV-Flash 220 and/or HV-DB 240 and directs the memory controller to send control, address and data signals in response to the system calls and in compliance with the memory interface standard the system is using (e.g., the JEDEC DDR4 LRDIMM Standard). In certain embodiments, the FET switches, FET-A, are configured to allow both the RCD 320 and the HV Controller 230 to receive the C/A signals from the MC during normal system operation, and the HV Controller 230 is configured to monitor the C/A signals from the memory controller and to recognize and act upon C/A signals formulated in response to system calls to access the HV-Flash 220 and/or the HV-DB 240.

Figure 6:
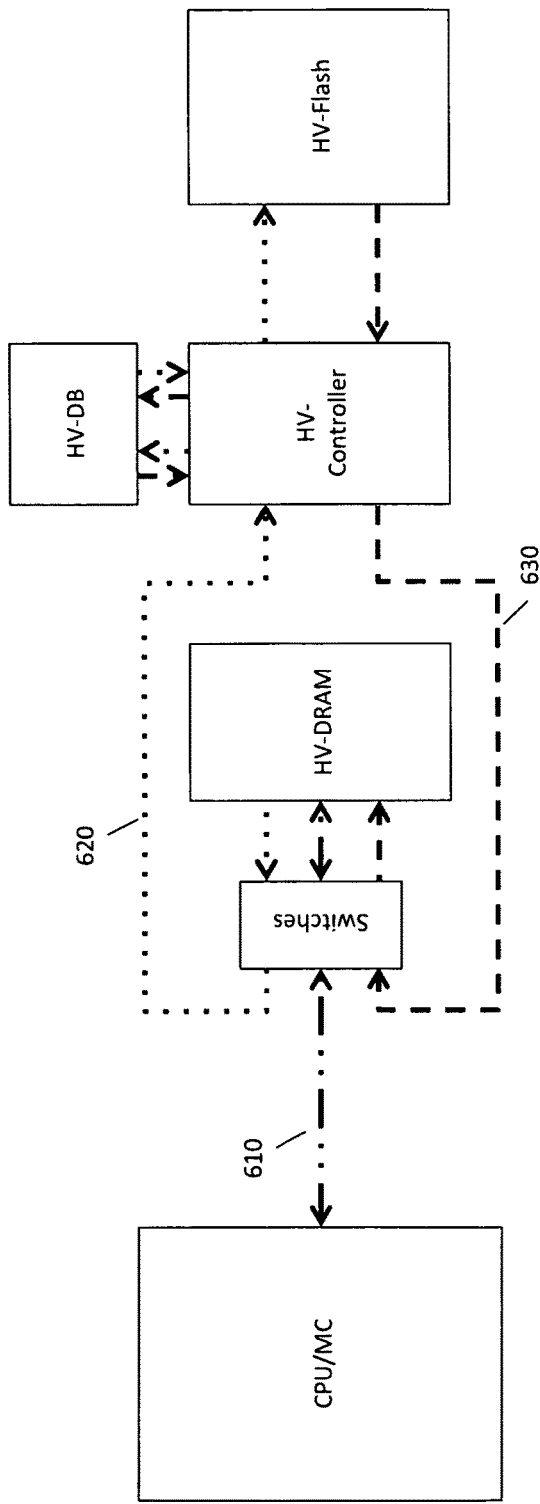
FIG. 6 is a block diagram illustrating different data paths supported by the hybrid memory module according to certain embodiments.

For example, as shown in FIG. 6, which illustrates different data paths supported by the HVDIMM 200. The dash/dotted lines represent the normal system read/write data path 610, by which the system performs read/write operations with the HV-DRAM 210 via the standard memory interface. The dotted lines represent a page-out (or swap-out) data path 620, by which the HVDIMM 200 transfers data from the HV-DRAM 210 to the HV-DB 240 and/or the HV Flash under the control of the HV Controller 230 and in response to system request to move the data from the main memory to the storage so as to, for example, make space in the main memory for data to be swapped in. The dashed lines 630 represent a page-in (or swap-in) data path, by which the HVDIMM 200 transfers data from the HV-DB 240 or the HV-Flash 220 to the main memory under the control of the HV Controller 230 and in response to system request to move the data from the storage to the main memory for random access by one or more software programs.

In certain embodiments, normal system access to the main memory is conducted between the system and the HV-DRAM 210, without much involvement from the HV driver 550 or the HV Controller 230. In certain embodiments, the memory interfaces in the computer system 100 are designed to be slave interfaces without per command handshake provision. So, the system does not have knowledge about whether any on-DIMM (intra-module) activities are occupying the DRAM I/Os. For example, if the DRAM I/Os are being occupied for transferring data between main memory and storage, and the system (memory controller) initiates a data read or write command with the expectation that the DRAMs would be ready to execute the system command, the DRAMs would fail to execute the system read/write operation and the system would experience a 'memory failure', which leads to a system failure.

In certain embodiments, for operations involving the HV-Flash 220 or HV-DB 240, such as a swap-in or swap-out operation, the HV driver 550 and the HV Controller 230 work together to move data in or out of the main memory without causing conflict with normal system access to the main memory. In certain embodiments, the HV-driver sends a memory access request to the memory controller when it needs to transfer data between DRAM (main memory) and Flash (storage) and provides the DRAM and the Flash addresses with this request. The memory controller may interleave the HV-driver requests with normal system memory access requests.

In certain embodiments, after receiving a page-in command to transfer data from the HV-Flash 220 to the HV-DRAM 210, the HV-controller monitors the memory read/write commands from the memory controller. If the memory address for a write command matches the target DRAM address in the page-in command, the HV-controller replace the write data from the system with the data from the Flash. On the other hand, after receiving a page-out command to transfer data from the HV-DRAM 210 to the HV-Flash 220, the HV-controller monitors the memory read/write command from the memory controller. If the memory address for a read command matches the source DRAM address in the page-out command, the HV-controller snoops the DRAM read data, and transfer the DRAM read data to the Flash.

Figure 7A:
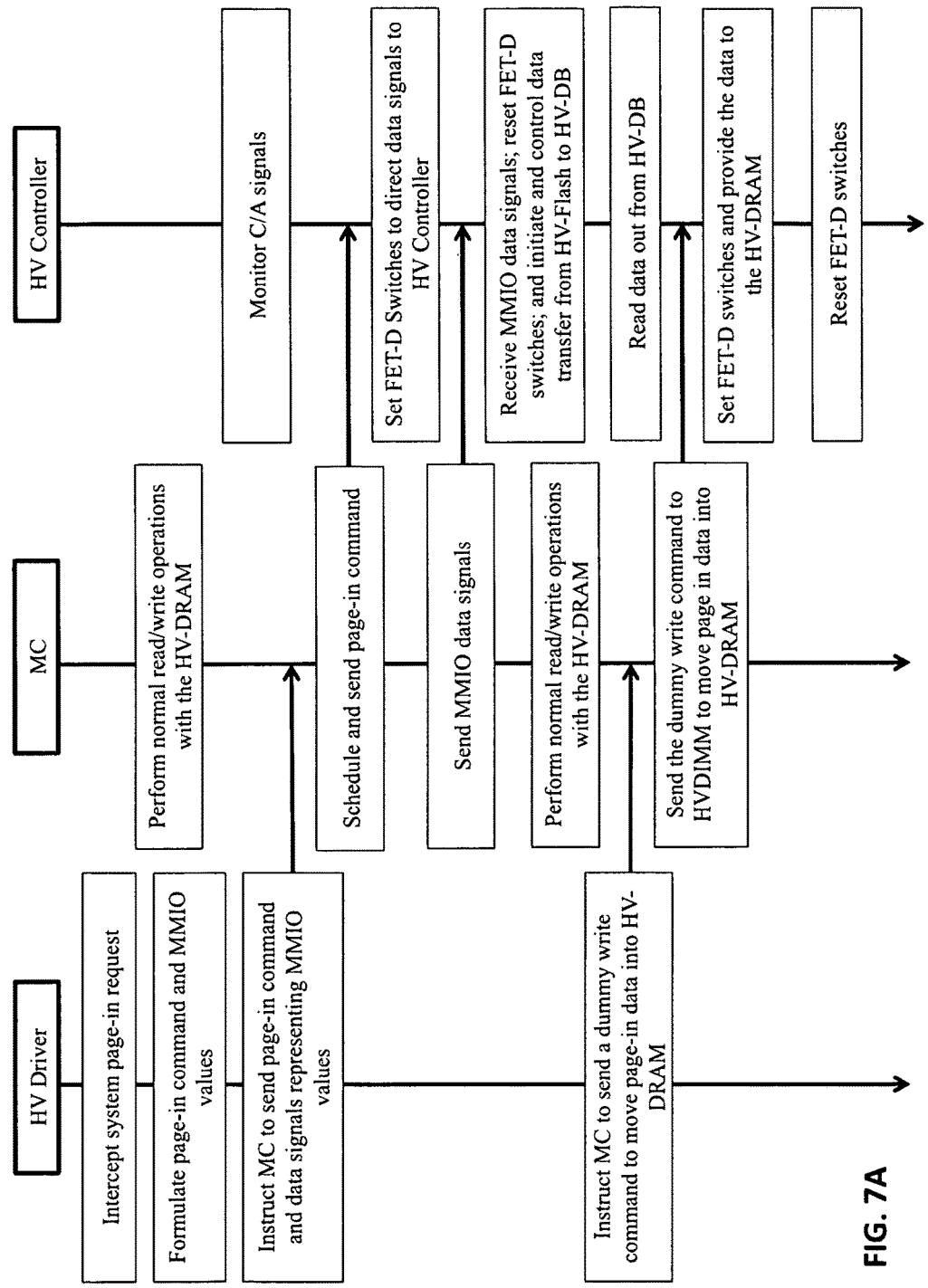
FIGS. 7A and 7B are flowcharts illustrating respectively page-in and page-out processes in the computer/server system according to certain embodiments.

For example, as shown in FIG. 7A, when a page-in request is issued, the HV Driver would intercept the page-in request and formulate a page-in command and memory-mapped I/O (MMIO) signal values according to the page-in request, which may include a source address range in the storage and a destination address in the main memory. The HV driver 550 instructs the memory controller to issue the page-in command to the HVDIMM 200. The page-in command uses the same set of C/A signals as a standard write command but with one or more designated C/A signals (e.g., chip select signal(s)) asserted or deasserted to indicate that this is not a normal write command for the DRAM devices 310 to respond to. The memory controller would schedule and send the page-in command as if it is a standard write command. The RCD 320 in the HV-DRAM 210 is configured to recognize this page-in command and would not forward the C/A signals to the DRAM devices 310. The HV Controller 230 on the other hand has been monitoring the C/A signals and would act upon the page-in command by controlling the data transfer between HV-DRAM 210 and the HV-Flash 220 or HV-DB 240.

In certain embodiments, the HV Controller 230 in response to the page-in command may set the FET switches, FET-D, to direct the data signals associated with the page-in command to the HV Controller 230. These data signals represent the MMIO values formulated by the HV driver 550 and include further information/instructions related to the swap-in request, such as what addresses to take data from in the HV-Flash 220 and what addresses in the HV-DRAM 210 to place the data. In certain embodiments, after receiving the MMIO signals, the HV Controller 230 may check whether the requested page-in data has already been loaded into the HV-DB 240, and if not, the HV Controller 230 would initiate and control data transfer from the HV-Flash 220 to the HV-DB 240 by reading the page-in data from the HV-Flash 220 and writing the page-in data to the HV-DB 240 using the data buffer 420 in the HV Controller 230 as temporary storage for the page-in data between the read and write operations. In certain embodiments, after all page-in data are transferred to the HV-DB 240, the HV Controller 230 may reload some of the page-in data into the data buffer 420 in the HV Controller 230, reset the FET-D switches to allow the HV-DRAM 210 to perform normal memory operations with the memory controller, and wait for the command from the memory controller to write the data into the HV-DRAM 210.

In certain embodiments, the HV driver 550 is configured to wait for a certain amount of time to allow the page-in data to be transferred from the HV-Flash 220 to the HV-DB 240. The HV driver 550 may determine the amount of time based on how much data is being paged-in. Afterwards, the HV driver 550 would instruct the memory controller to schedule and send a dummy write command to the HVDIMM 200. In certain embodiments, the dummy write command is like a normal write command except that it is followed with dummy data or no data from the memory controller. The HV Controller 230 would recognize the dummy write command since it is directed at the same addresses the page-in data should be placed. In response, the HV Controller 230 would set the FET-D switches and would provide the page-in data to the DRAM devices 310. The dummy data from the memory controller is thus ignored or discarded. In certain embodiments, the HV Controller 230 outputs the page-in data to the DRAM devices 310 a certain time period after receiving the dummy write command so that the data appears at the DRAM I/Os in accordance with the CAS latency parameters of the DRAM devices 310. After page-in data associated with the dummy write command has been written into DRAM, the HV Controller 230 would reset the FET-D switches to allow the DRAM to perform normal system memory operations.

Figure 8:
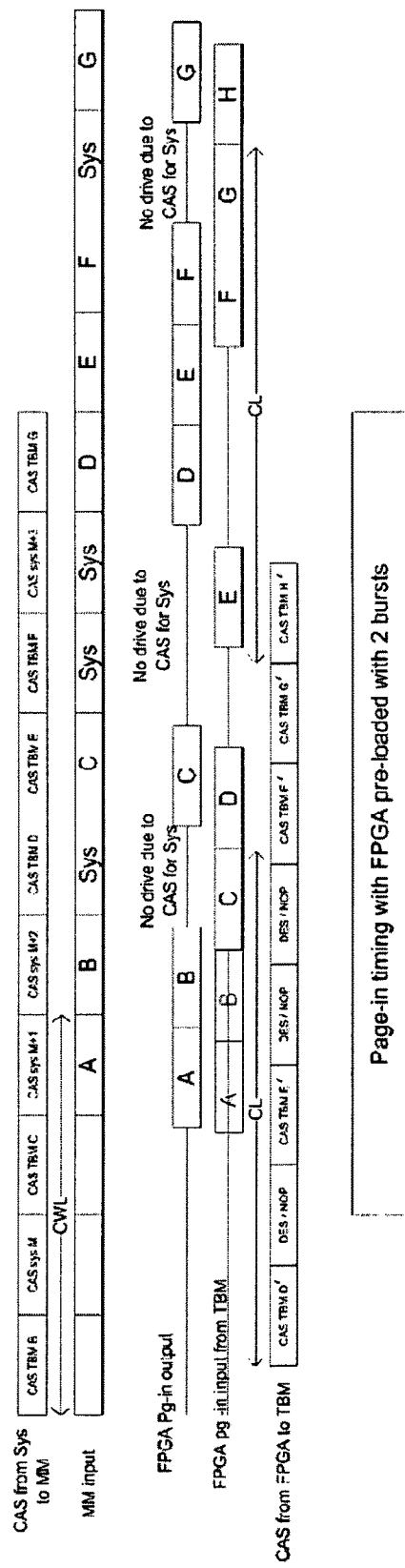
FIG. 8 is a block diagram illustrating interleaving of page-in data flow with normal memory accesses to avoid data access conflicts according to certain embodiments.

In certain embodiments, the HV Controller 230 is configured to monitor the memory commands from the memory controller and schedule on-DIMM (intra-module) data transfers accordingly to avoid data access conflicts. In certain embodiments, the HV Controller 230 would work around system memory accesses when placing the page-in data at the DRAM I/Os, so as to avoid system failure caused by such data access conflicts. For example, as illustrated in FIG. 8, as data A through G are being paged in from the HV-DB 240 (TBM) to the main memory (MM), the system may also be issuing memory access commands to write data M, M+1, M+2, M+3 into the main memory (MM). The memory controller may schedule the memory commands from the system and the dummy write commands from the HV driver 550 as follows:

CAS TBM A (not shown)—which is a dummy write command from the HV driver 550 to transfer data A from TBM to main memory (MM);

CAS TBM B—which is a dummy write command from the HV driver 550 to transfer data B from TBM to main memory (MM);

CAS sys M—which is a normal write command to write data M from system into MM;

CAS TBM C—which is a dummy write command from the HV driver 550 to transfer data C from TBM to main memory (MM);

CAS sys M+1—which is a normal write command to write data M+1 from system into MM;

CAS sys M+2—which is a normal write command to write data M+2 from system into MM;

CAS TBM D—which is a dummy write command from the HV driver 550 to transfer data C from TBM to main memory (MM);

CAS TBM E—which is a dummy write command from the HV driver 550 to transfer data C from TBM to main memory (MM);

CAS TBM G—which is a dummy write command from the HV driver 550 to transfer data C from TBM to main memory (MM);

CAS sys M+3—which is a normal write command to write data M+3 from system into MM; and CAS TBM H (not shown)—which is a dummy write command from the HV driver 550 to transfer data H from TBM to main memory (MM).

Before the system issues the CAS TBM B command, the HV Controller 230 (referred to in the figure as "FPGA") may have issued CAS TBM A', CAS TBM B', and CAS TBM C' commands to the TBM to output data A, data B, and data C to the HV CONTROLLER. The HV Controller may preload data A and data B from the TBM (as shown by the data blocks A and B in the "FPGA pg-in input from TBM") and place it in the data buffer 420 in the HV Controller. Afterwards, data C is output from the TBM in response to CAS TBM C' from the HV Controller.

The HV Controller continues to issue CAS TBM D' to the TBM when the HV Controller observed the CAS sys M command from the system. In response, the HV Controller issues a DES/NOP command to the TBM to pause the data transfer between the TBM and the MM. Thus, FPGA page-in (Pg-in) output is paused, as shown by the gap between data B and data C in the FPGA Pg-in output, and system data M (Sys) is received by at the MM input. Afterwards, the HV Controller continues to issue CAS TBM E' to the TBM when it observed CAS sys M+1 and later CAS sys M+2 from the system. In response, the HV Controller issues two consecutive DES/NOP commands to pause the TBM from outputting data to the HV Controller. As a result, no data is output between data E and data F from the TBM, and no data between data C and data D is driven from the HV Controller to the MM, leaving a gap in the HV Controller output to the MM to allow the MM to take system data M+1 and M+2 (Sys).

In certain embodiments, the HV Controller 230 is further configured to perform shadowed data transfer operations between the HV-DRAM 210 and the HV-Flash 220. For example, when a system command targets a DRAM address that has been preprogrammed as an address that requires data to be transferred from the HV-Flash 220, the HV Controller 230 would perform such a transfer to enable proper system access to this preprogrammed address.

Figure 7B:
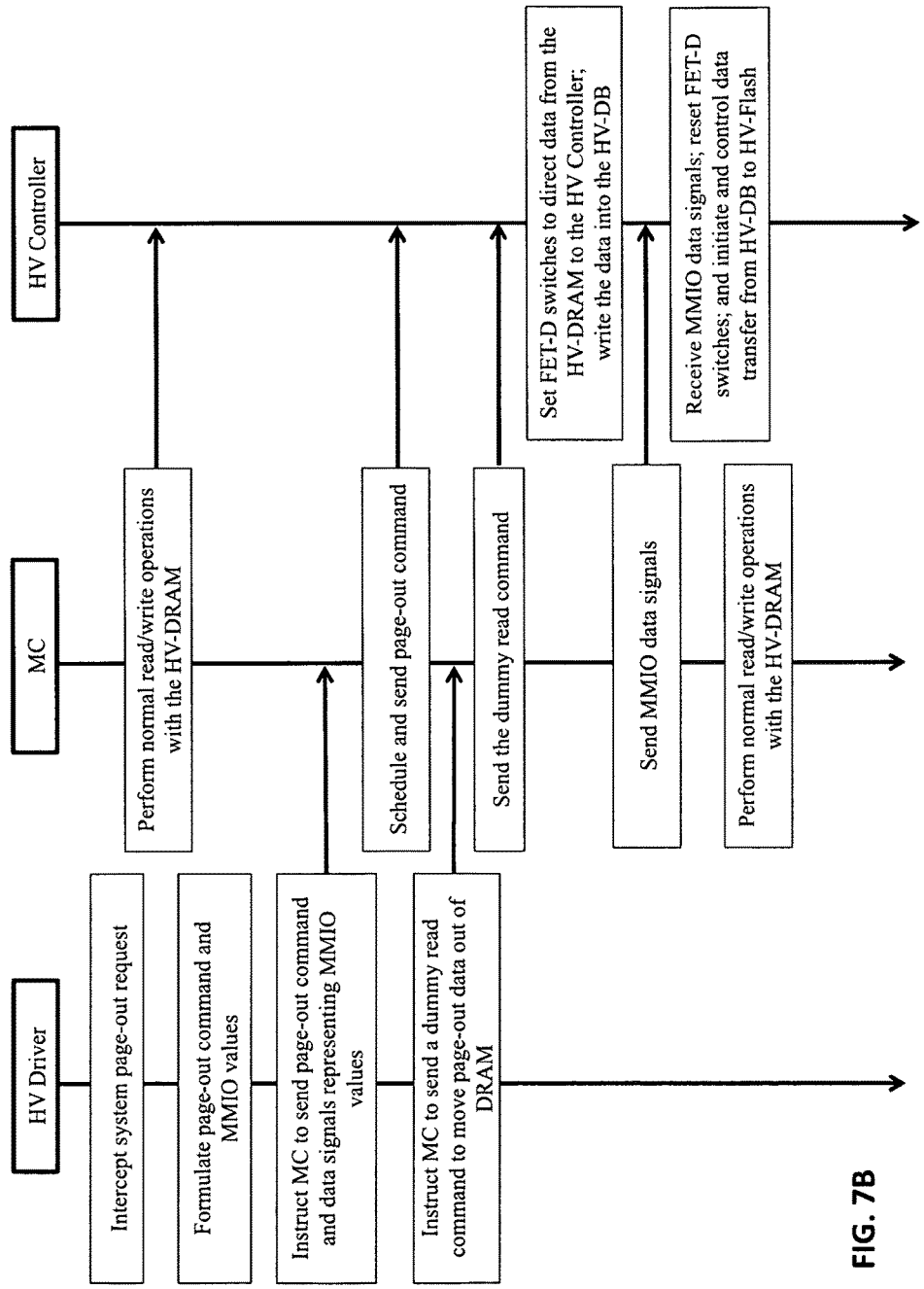

The page-out operations can be performed similarly but in opposite direction and in a different order, as exemplified in FIG. 7B. Thus, the page-out/page-in process can be orders of magnitude faster than using PCIe SSD or conventional memory channel storage because the page-in and page-out data can be transferred between the main memory and the storage on the HVDIMM 200, without going through the memory channel or the CPU. In addition, system performance is further improved because the data transfer between HV-Flash 220 and HV-DRAM 210 also frees up the main memory channel and the CPU. In certain embodiments, data in the HV-Flash 220 is stored in DRAM format, so there is no need to convert the data format as data is being moved between the HV-Flash 220 and HV-DRAM 210, which is conventionally performed by the CPU.

Figure 9:
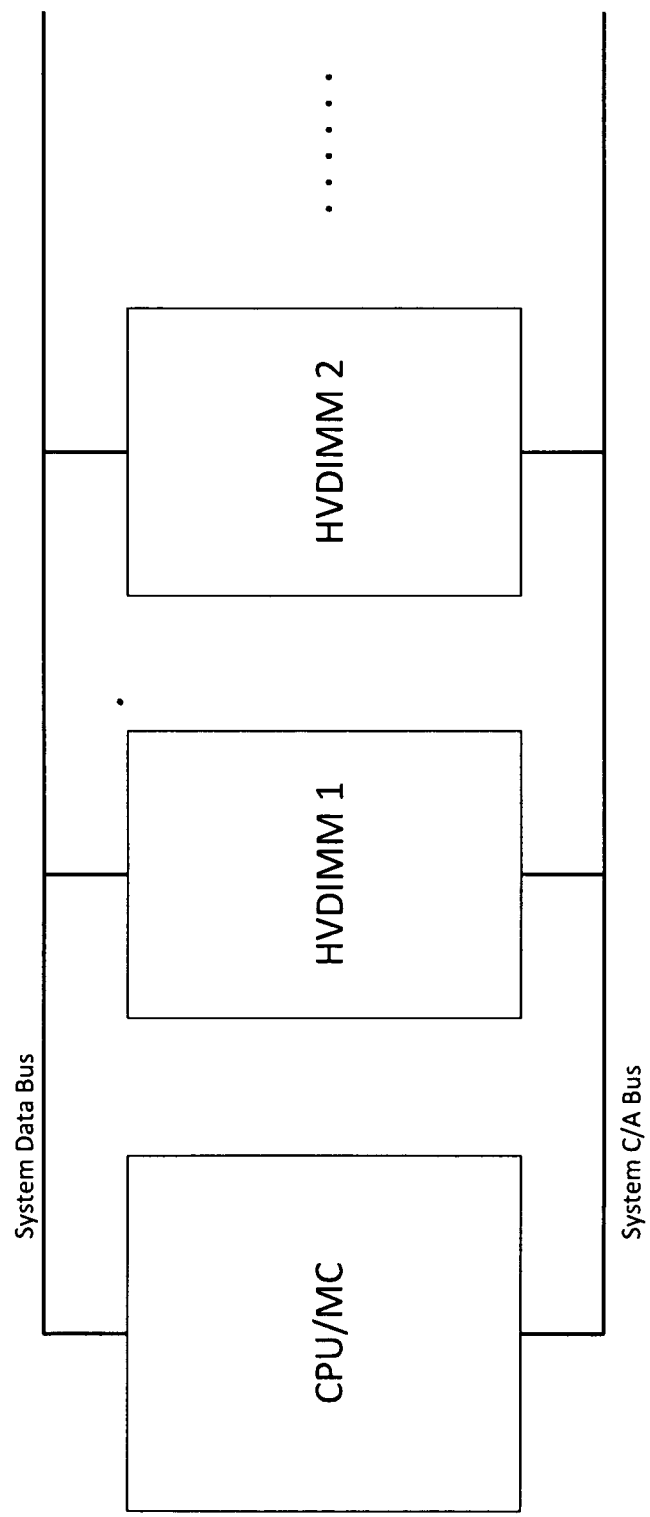
FIG. 9 is a block diagram illustrating multiple HVDIMMs being used together to provide system memory and/or storage on a memory channel.

In certain embodiments, as shown in FIG. 9, multiple HVDIMMs 200, e.g., HVDIMM 1, HVDIMM 2, etc., can be used together to provide the system memory and/or the storage coupled to the CPU/MC via the system bus, which includes a system control/address bus and a system data bus.

Since the operating system sees the Flash space of all HVDIMM 200s as a unified HVDIMM 200 storage, and the system may not know which physical Flash devices are located on which physical HVDIMM 200. As a result, the HV driver 550 could issue a page-out command with the DRAM address on one HVDIMM 200 and the Flash address on another HVDIMM 200.

To address this issue, the HV driver 550 in certain embodiments builds a memory association table, as shown in FIG. 10. Since the operating system views the storage provided all of the HVDIMM 200s as one storage disk (say, the K-disk), the driver can partition the K-disk into a plurality of sub-disks, K1, K2, . . . Kn, each associated with the a respective HVDIMM 200. For example, as shown in FIG. 10, the memory association table has 24 entries per CPU, which in certain embodiments is the number of DIMM socket per CPU. Each entry correspond to a respective HVDIMM 200 and includes the sub-disk number, the HVDIMM 200 ID, the minimum and maximum address bounds for the HV-DRAM 210 on the DIMM, and the minimum and maximum address bounds for the HV-Flash 220 on the DIMM. Thus, by consulting the memory association table, the HV driver 550 would try to swap data within the address bounds of the HV-DRAM 210 and the HV-Flash 220 on the same HVDIMM 200.

In general, for cost/performance/power reasons, the memories in a computer/server system are arranged in layers such that faster and smaller memories are located within (or close) to a memory cores (e.g., first layer cache), and density and access time increase as memory is physically and electronically further away from the core. There are layers of cache memories in a CPU/MC package, and the memory module(s) that are connected to the MC via a dedicated memory channel in the system bus is regarded as the main memory, which provides dynamic random data access by the CPU. The storage devices are further away from the CPU and are usually very large memories in the system, such as hard disc devices (HDD), solid-state storage devices (SSD), etc., but they do not provide dynamic random access capabilities.

Figure 11:
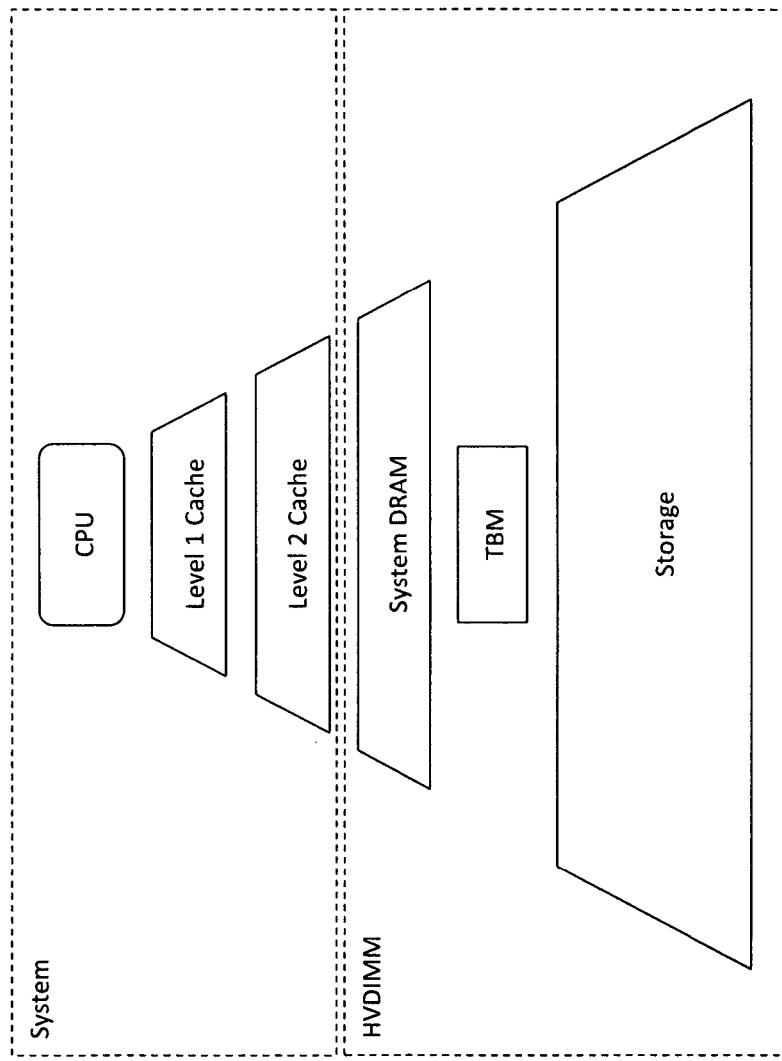
FIG. 11 is a diagram illustrating a memory structure in the computer or server system according to certain embodiments.

The memories in the computer system 100 are somewhat similarly structured, as shown in FIG. 11 except that the storage provided by the HVDIMM 200 are not far away from the CPU and data from the storage can be moved into the HV-DRAM 210 for random access without going through a south bridge, or a PCI bus, or even the memory channel. Furthermore, the HVDIMM 200 provides the HV-DB 240, which can act as a cache memory for the HV-DRAM 210 by storing data which the HV-DRAM 210 does not have space to hold and which can be quickly moved into the DRAM when needed in response to a dummy write command from the memory controller.

In certain embodiments, the HVDIMM 200 is configured to provide a very large, configurable, expandable, dynamic random access system memory to a computer system. The HVDIMM 200 incorporates novel memory cache layer techniques, i.e., the Memory Window techniques, where the HV-DRAM 210 holds contiguous and complete sections of HV-Flash 220 for dynamic access by the computer system. Thus, the HV-Flash 220 works as a data vault to the HV-DRAM 210, such that the computer system can open up a Memory Window (MW) in the HV-Flash 220 and bring needed data stored in the HV-Flash 220 to the HV-DRAM 210 via Memory Window for dynamic random access by the System.

Figure 12:
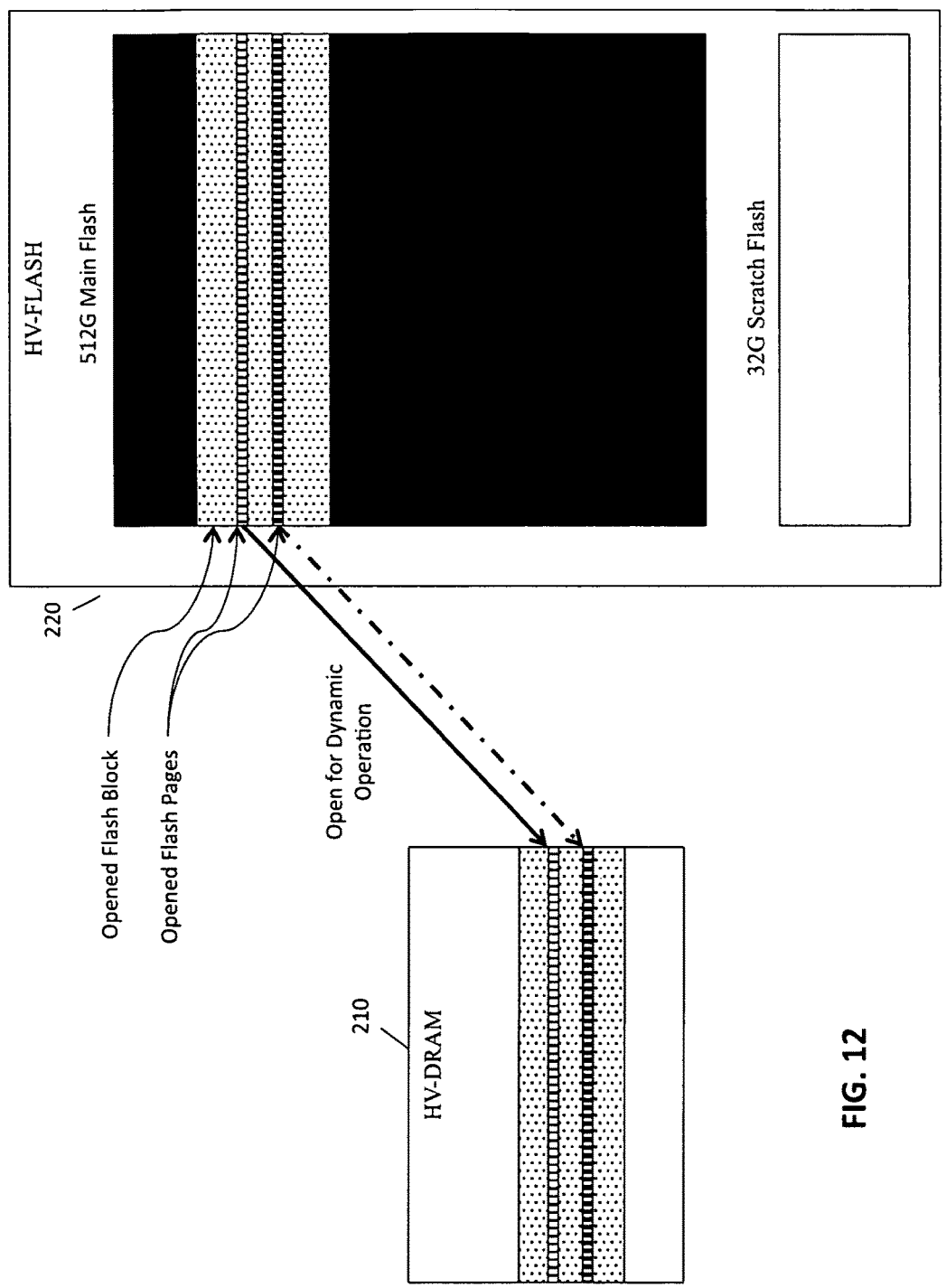
FIG. 12 is a diagram illustrating memory spaces in the hybrid memory module during a memory window operation.

In certain embodiments, the HVDIMM 200 can perform two types of operations concurrently: standard memory operation (SMO), as discussed above, and Memory Window operation (MWO). During SMO, the HVDIMM 200 provides a standard main memory space via a standard protocol (e.g., the JEDEC DDR4 LRDIMM protocol). During MWO, as shown in FIG. 12, a specific memory area (MW), such as a Flash segment or block, in the HV-Flash 220 is opened up to support high speed dynamic random access by the computer system. Requested data in the specific memory area is moved from the Flash to the DRAM. If the system requests to open up more MWs than the DRAM space is allowed, the system has the option to have the HVDIMM 200 overwrite the least recently used (LRU) DRAM area, or overwrite a specific DRAM location. The data from a DRAM area is moved back from the HV-DRAM 210 to the HV-Flash 220 either when there is no more open pages for a specific duration (by default), or when the system specifically requests to save the data. The MWO can be a background operation that is controlled by the HVDIMM 200 controller (HV Controller 230).

Thus, to the computer system, the HV-Flash 220 can also be viewed as a very high-speed access storage because data does not need to be moved from a separate storage unit to the main memory, and because data from any specific memory area in the Flash can be accessible via the memory channel upon request from the system to open up a MW. In certain embodiments, the system can make a single request to open a MW with a certain size.

In one embodiment, the HVDIMM 200 is a multi-rank (e.g., 2-rank) DIMM, and the HV Controller 230 controls each rank independently, so that the system can access one rank while the HV Controller 230 performs an MWO. In general, however, it is preferred that the MWO be executed on both ranks in unison for better memory management. Regardless of whether the system executes MWO per rank or on both ranks in unison, the HV Controller 230 can set its internal (per rank) register bits to indicate completion of an MWO. As stated above, the system can also configure the HV Controller 230 to generate an interrupt signal when the MWO is completed instead of or in addition to setting the register bits.

In certain embodiments, the HV Controller 230 also controls the boot-up process for the HVDIMM 200. There are two types of boot; Fresh boot (booting after a clean shut down) and Reboot (booting after a power failure). Unlike the Fresh boot case (where there is no valid data in HVDIMM 200), Reboot requires the HV Controller 230 to populate the HV-DRAM 210 with the same data that was in HV-DRAM 210 at the time of power-loss.

The HVDIMM 200 can have two very different operation frequencies, the HV mode frequency and the LRDIMM mode frequency. The HV mode frequency is used to transfer data between HV-DRAM 210 and HV-Flash 220 while the LRDIMM mode frequency is used to transfer data between HVDIMM 200 and the system. In certain embodiments, the HV-DRAM 210 has two operational modes, a standard operation mode and a MW mode. During the standard operation mode, the HV-DRAM 210 fully supports standard memory operations (e.g., the JEDEC DDR4 LRDIMM operations) including the initialization and training protocols. When the HV-DRAM 210 is in the MW mode, the HV-DRAM 210 operates with its DLL turned off since the MW mode of operation frequency (HV mode frequency) is much slower (e.g., an order of magnitude slower) than the frequency range of the DLL, which covers the standard operation mode frequency. The HV Controller 230 uses the HV mode frequency for MW operations, during which the DRAM and RCD 320 is put into the JEDEC DLL-off operational state.

In certain embodiments, commencement of a MWO is initiated by a request from the System. FIG. 5 is a block diagram of certain components in the CPU with an integrated MC according to certain embodiments. As the memory channel between the MC and the HVDIMM 200 may not allow sufficient number of address bits to address the entire memory space in the HV-Flash 220, the System may keep a look-up table about which areas of the HV-Flash 220 have been copied in the HV-DRAM 210 for random access. As shown in FIG. 7A, when the System needs to access a certain memory area in the HV-Flash 220, the System would check the lookup table to determine whether data stored in the memory area has been copied to a certain area in the HV-DRAM 210, i.e., a whether a MW is opened in the HV-Flash 220 to allow the System access to the data. If the answer is yes, the MC would proceed to perform memory operations to access the memory area in the DRAM. If the answer is no, the System would send a request to open the MW in the HVDIMM 200. The request would include identification of the memory area in the HV-Flash 220 to be accessed, such as a starting address of the memory area and a size of the memory area, and a destination address in the DRAM, to which data from the memory area is to be transferred. If the System needs more than one MWs, more than one requests can be sent one after another. In certain embodiments, the request is sent directly to the HV Controller 230 in the HVDIMM 200 via the I²C bus or any other system management/control bus. In certain other embodiments, the request is sent to and processed by the DMA controller so that the System can continue to perform other memory operations via the memory channel while the MW is being opened.

Figure 13:
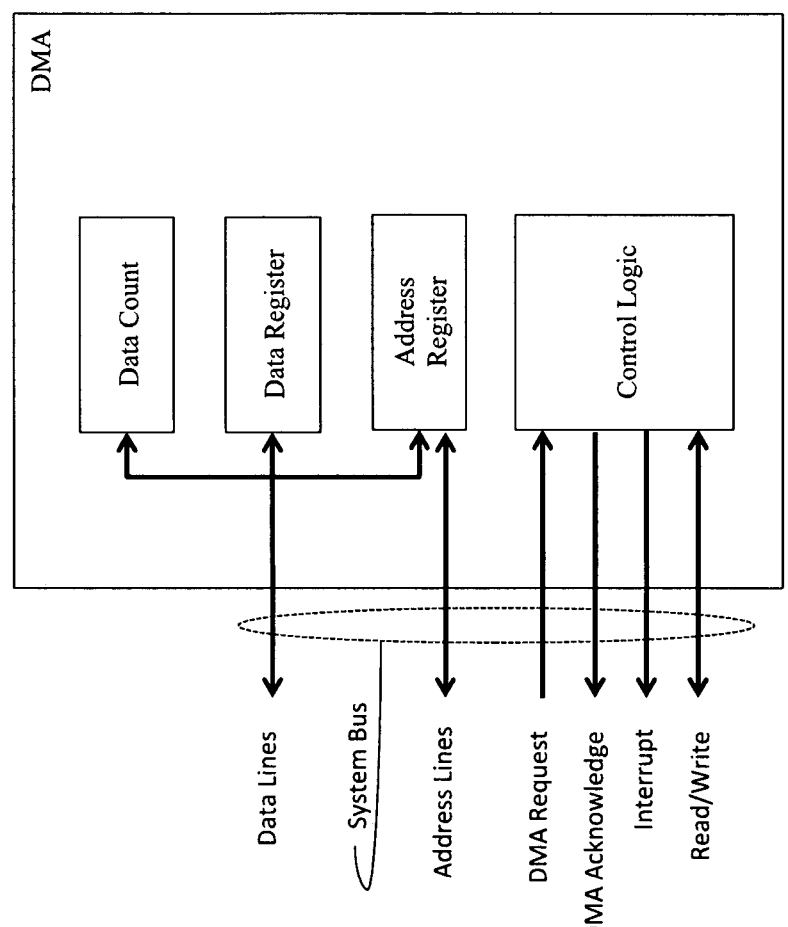
FIG. 13 is a block diagram of an exemplary DMA controller according to certain embodiments.

In certain embodiment, the DMA controller is used to control certain aspects of the MWO processes. FIG. 13 is a block diagram of an exemplary DMA controller. In certain embodiments, the (DMA) controller can be used in conjunction with the CPU/MC to initiate and monitor MWO in the HVDIMM 200. Without DMA, the CPU/MC can be occupied for part of or the entire duration of a MWO, and is thus unavailable to perform other tasks. With the DMA, the CPU can simply initiate a data transfer request to the DMA and then performs other operations while the transfer is in process. When the data transfer is done, the CPU is notified by an interrupt from the DMA controller. Thus, the DMA can offload extensive memory operations from the CPU. Many hardware systems use DMA, including disk drive controllers, graphics cards, network cards and sound cards. DMA is also used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel.

Figure 14:
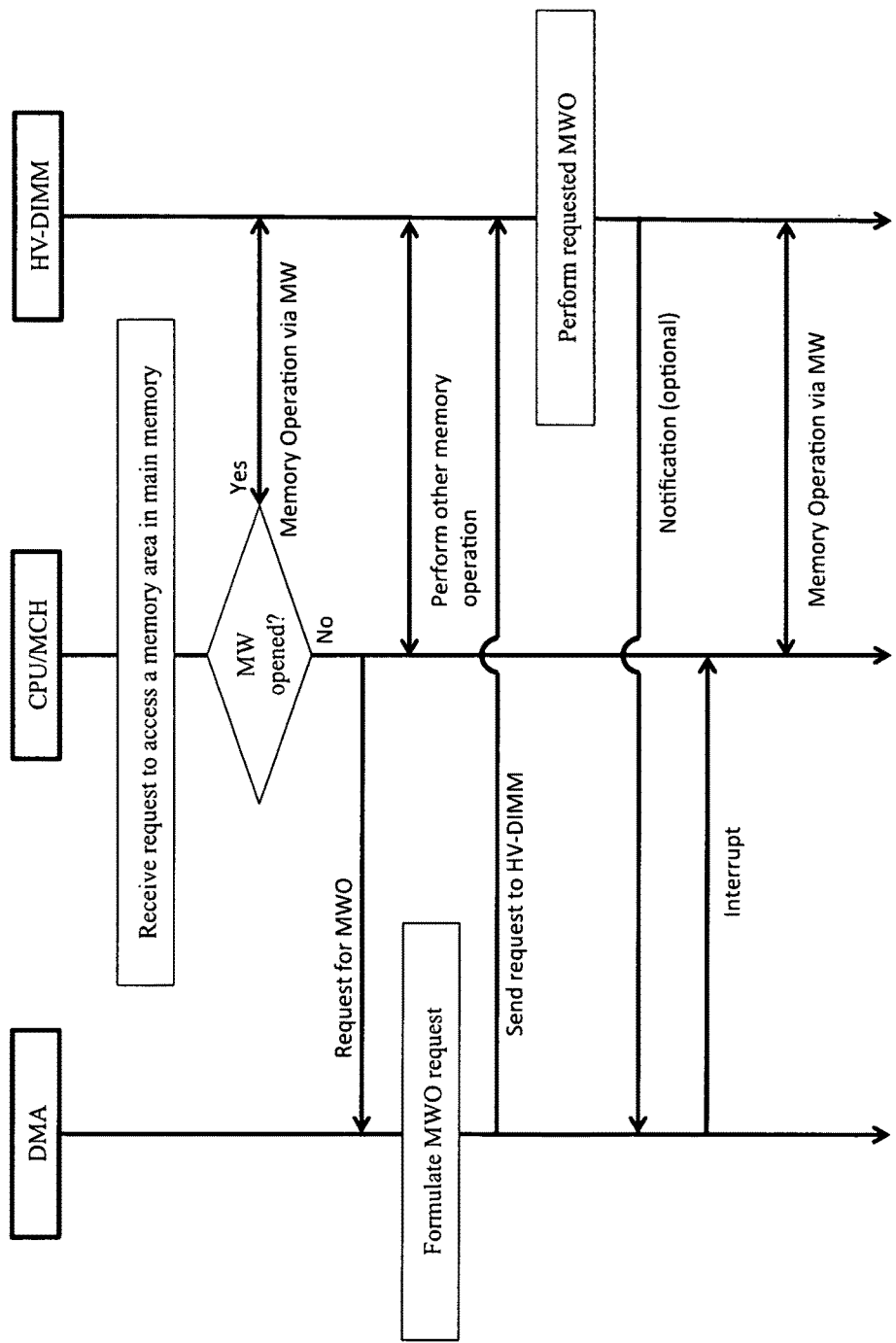
FIG. 14 is a flowchart illustrating memory window operation processes according to certain embodiments.

In certain embodiments, as shown in FIG. 14, the DMA receives a request from the CPU/MC to open a MW (MW) in the HVDIMM 200. The DMA can buffer the request and forward the same or reformulated request to the HV Controller 230 via the I²C bus. The DMA can actively monitor the associated MWO in the HVDIMM 200 and inform the CPU/MC via an interrupt when the MW is opened.

Characteristics associated with Flash memories such as limited endurance and slow writes may require the HVDIMM 200 to obtain support from an operating system (OS) running on the CPU. The OS may also need the knowledge of the movement of pages between the DRAM and Flash so as to know when to hide the weak characteristics of the Flash. At boot up, the OS needs to allocate memory pages in the DRAM. After write to a certain page, the OS may also need to know an estimated time when a next write to the page can be performed. The OS may also need to set page-table entries for the DRAM pages and Flash pages. Some or all of these tasks can be offloaded to the DMA, which include status registers, internal memories and control logic 410 to keep track of these activities.

For example, the DMA can store information regarding how long the HV Controller 230 may need to transfer a certain amount of data from the HV-Flash 220 to the HV-DRAM 210. Thus, the DMA does not need to wait to receive a notification from the HV Controller 230 before telling the CPU/MC that the memory window has been opened for dynamic random access. Alternatively or additionally, the DMA can break a request to open a Memory Window into multiple requests each for a smaller chunk of data of a predetermined size (e.g., 4 KB), as the time required to complete each of such data transfers is more predictable.

Thus, the HVDIMM 200 allows the system to open up a Memory Window in a HV-Flash 220 block for dynamic operation. The system sends the starting address and the data size to HV, and the HV Controller 230 opens up the block of memory containing the data and transfers the amount of requested data into the HV-DRAM 210. In certain embodiments, the minimum transfer size per HV-Flash 220 block is 32 KB, and the maximum size is the HV-Flash 220 block size (e.g., 4 MB). Therefore, if the transfer size per HV-Flash 220 block is 32 KB, for 8 GB DRAM, the system can open up to 250K HV-Flash 220 blocks simultaneously.

TABLE 1

| Address type | Description | # of bytes |
| --- | --- | --- |
| HV-FLASH physical address for block | 64K blocks | 2 |
| System (Virtual Physical) Address per block | | 2 |
| HV-FLASH offset addresses with byte size in 32 KB unit for Memory Window per block | Total of 16 × 1 byte offset address | 16 |
| DRAM address (row address) for the HV-FLASH offset address of 32 KB unit | Total of 16 × 2 byte address | 32 |
| 32 GB scratch Flash address for the HV-FLASH offset address of 32 KB unit closed | Total 16 × 3 bytes | 48 |

In certain embodiments, the HV Controller 230 is configured to provide HV-Flash 220 address management and keeps track of physical HV-Flash 220 addresses in relation to virtual-physical addresses known to the system. This can be done by creating and updating an address mapping table, which maps the system (virtual-physical) address to the HV-Flash 220 physical address for tracking the address of any particular Flash block, and to the offset address of each opened (and copied to HV-DRAM 210) memory location within each block. HV Controller 230 uses the offset addresses to correctly place data from HV-DRAM 210 back into proper locations within a particular block of Flash memory. Table 1 lists description and sizes for a few address types according to certain embodiments.

Figure 15A:
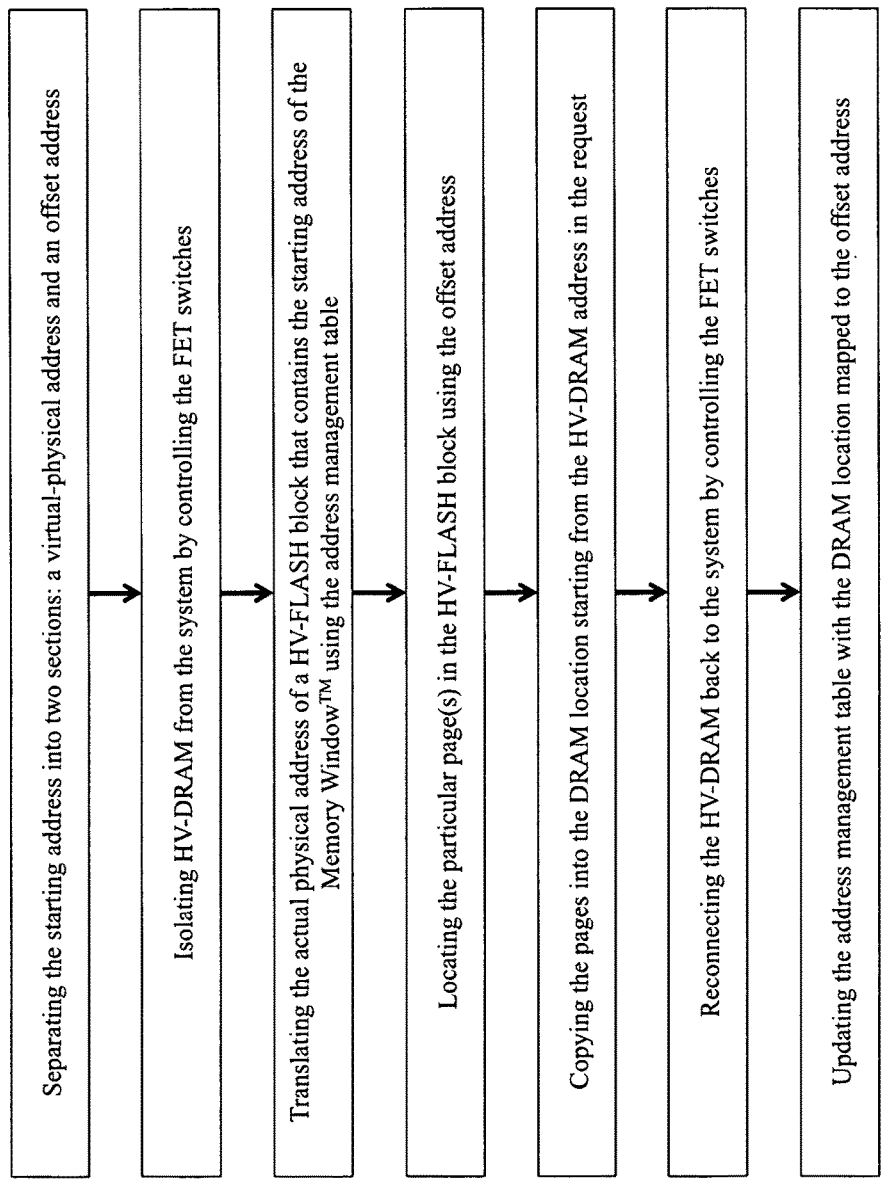
FIGS. 15A and 15B are flowcharts illustrating respectively processes carried out by the module controller to open and close a memory window in the hybrid memory module according to certain embodiments.

FIG. 15A illustrates certain processes carried out by the HV Controller 230 to open a memory window in the HV-Flash 220 for dynamic random address by the system according to certain embodiments. In certain embodiments, the HV Controller 230 may notify the DMA or CPU/MC that a Memory Window has been opened after data from the memory window has been successfully transferred to the DRAM. In other embodiments, the HV Controller 230 may predict the time when the transfer would be completed based on the request for the Memory Window and historical information, and send the notification to the DMA or CPU/MC before the completion of the transfer so that the data transfer will be completed when the CPU/MC receives the interrupt from the DMA or the notification directly from the HV Controller 230 and gets around to start the memory operation with the memory window.

Figure 15B:
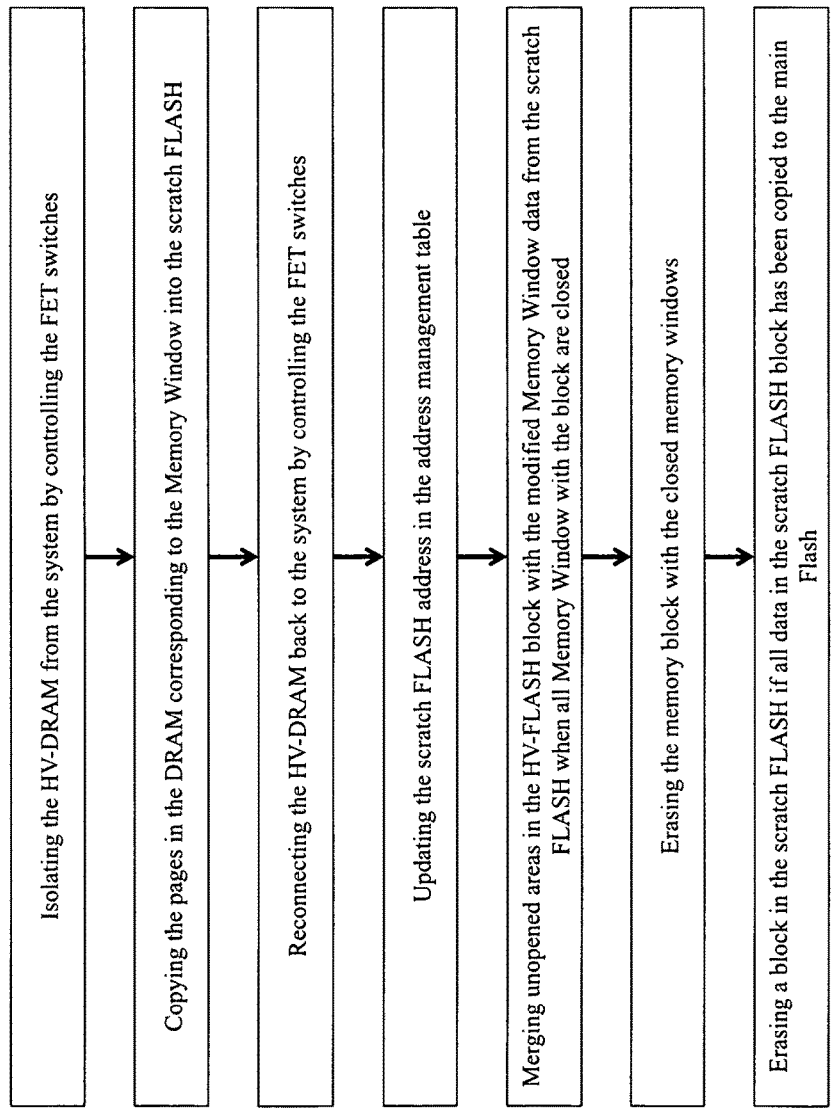

FIG. 15B illustrates certain processes carried out by the HV Controller 230 to close a memory window according to certain embodiments. The system may request to close a HV-Flash 220 area via the I²C interface or some other system control bus interface. The request may include a starting HV-DRAM 210 address and the size of the Memory Window. In certain embodiments, if the system needs to close one Memory Window but leaves other Memory Windows within a HV-Flash 220 block open, the HV Controller 230 would not close (update) the HV-Flash 220 block until all Memory Windows within the block are closed.

In case of a catastrophic system failure due to, for example, power loss, the HV Controller 230 may also assume the responsibility of moving data from HV-DRAM 210 to HV-Flash 220 and closes the open blocks. If none of updated HV-DRAM 210 data has been stored into HV-Flash 220, the maximum size of data that HV Controller 230 may need to move can be as large as the DRAM size, e.g., 8 GB.

In certain embodiments, to make room for a Memory Window in the HV-DRAM 210, certain DRAM pages may need to be moved to Flash. The HV Controller 230 would execute one or more pre-erased Flash pages and copy the one or more DRAM pages into the Flash. The copying can be completed without slowing or stalling the CPU. Small copies of the DRAM pages can also be staged or held in the DRAM or in a cache-buffer/scratch-pad in the HVDIMM 200 for the OS to the control.

Figure 16:
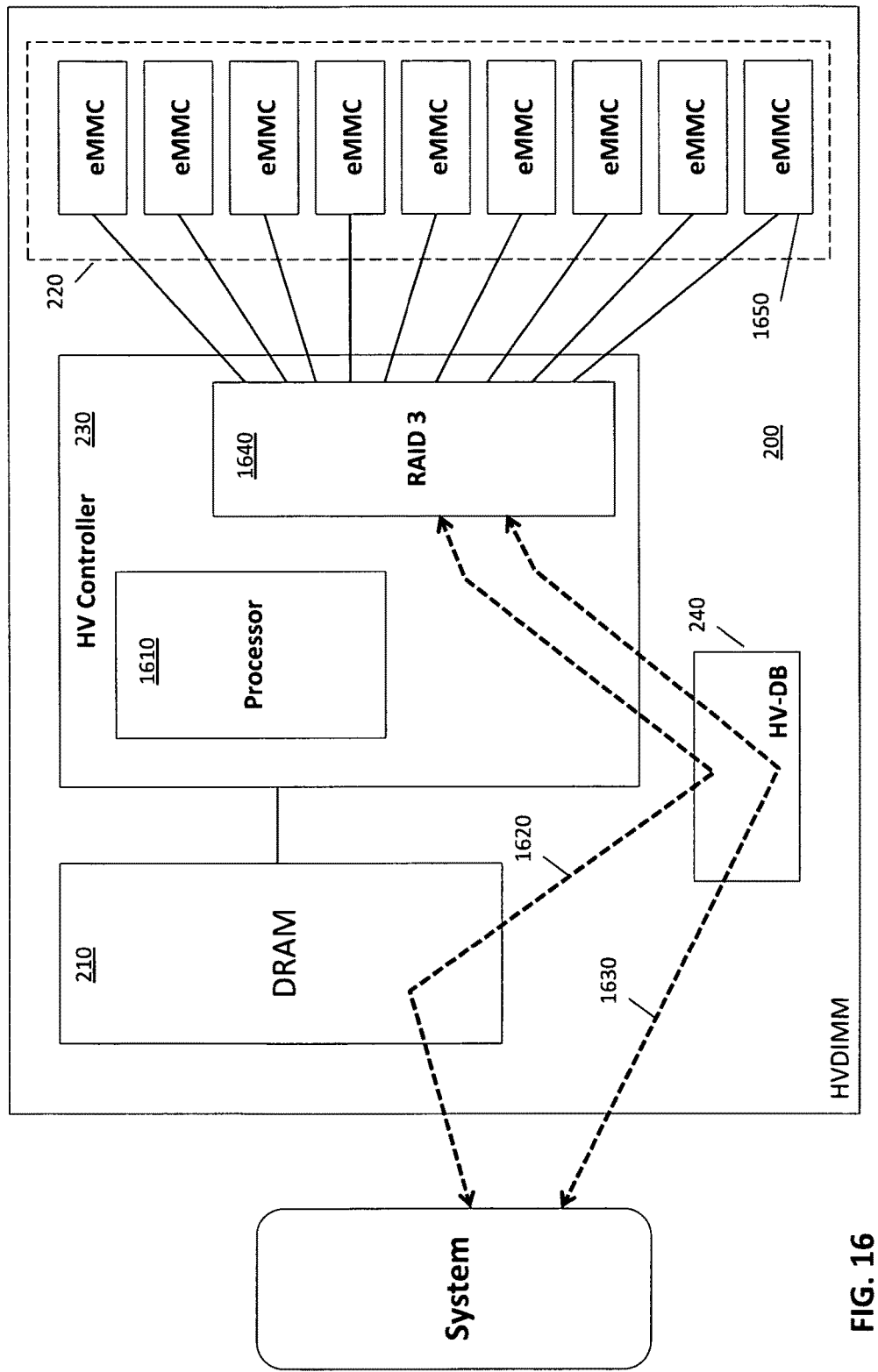
FIG. 16 is a block diagram illustrating the hybrid memory module according to further embodiments.

In certain embodiments, as shown in FIG. 16, the HV Controller 230 includes a built-in processor 1610 and associated hardware (e.g., a dual ARM cortex A9 core configuration integrated as a part of an FPGA SOC), and can act as a co-processor to provide on-DIMM (intra-module) data handling, such as searching, sorting, screening, categorizing, structuring, formatting, etc. Thus, certain tasks traditionally performed by the system CPU can be offloaded to the co-processor so that the overall system performance can be significantly improved. Examples of such tasks include, but are not limited to, in-memory compression/decompression (e.g., source of data in one segment of DRAM and processed data in another segment of DRAM), in-memory encryption/decryption; security authentication, etc. Since the co-processor has direct access to the DRAM main memory or the Flash storage without system CPU's involvement, the co-processor can compress, encrypt, and authenticate data in on-DIMM memories without system-wide overhead.

In certain embodiment, software or firmware packages with Application Programming Interfaces (API) exposed to the system software are provided to support on-DIMM computing/processing. The software or firmware packages are run by the co-processor and may include, for example, software development kits (SDK), such as data compression SDK, data encryption SDK, data authentication SDK, etc. The firmware packages can be stored on the HVDIMM 200 or they can be downloaded from the system. The software or firmware packages can be configured to support different features and the configurations (e.g., license bits, bits indicating enabled functions) can be stored in a one-time programmable device (OTP) on the HVDIMM 200. For example, the HV Controller 230 can compress or decompress a certain block or section of data stored in the main memory or the storage on the HVDIMM 200 using a type of compression algorithm specified by corresponding configuration bits stored in the OTP.

As a further example, when the CPU is running a search process involving a large amount of data stored in the on-DIMM storage, the HV Controller 230 can pre-screen the data to reduce the data size to be handled by the CPU as the data is being transferred from the on-DIMM storage to the main memory. The HV Controller 230 can also sort the data to reduce the data categorization and collection time. The HV Controller 230 can also search the data to support fast querying of meta data information. In a further example, the data from the storage can be presearched so that only entries that are considered relevant to the search criteria are required to go through ECC and be loaded into main memory.

In further embodiments, the HV Controller 230 uses the HV-NIC (which can be, for example, an Ethernet interface controller) to provide direct data transfer between a network and on-DIMM memory, and data extraction/correction using the on-DIMM coprocessor, so that data can be loaded directly from the network, to the storage, the main memory, or both simultaneously, or vice versa, without going through the system CPU. Thus, the HVDIMM 200 supports efficient data sharing in a cluster environment.

For example, multiple HVDIMM 200s can be used in a Hardoop processing framework, which is an open-source software framework for storage and large scale processing of data sets on clusters of CPUs each representing a Datallode in a distributed computing environment. Each Datallode can include a number of HVDIMM 200s, which together can contain, for example, 192 GB of main memory and 3-6 TB of memory channel storage. Very fast memory channel storage through put rate (e.g., 39 GB per each 2 CPU server) can be achieved because of parallel data transfer between the Flash and the DRAM on multiple HVDIMM 200s. Furthermore, the storage on the HVDIMM 200 can be accessed with very low latency (comparable to the latency for accessing the DRAMs) because the storage is accessed through the memory channel. Since data is moved between HV-DRAM 210 and HV-Flash 220 without having to go through a storage channel or PCI interface, very large blocks of data (e.g., up to 1 GB) can be accessed in read dominated operations.

In certain embodiments, as shown in FIG. 16, the HVDIMM 200 provides a high bandwidth dedicated data path 1620 between the main memory and the storage on the HVDIMM 200 to support on-DIMM data processing, and fast 'page swap' and 'demand page' operations. In further embodiment, the on-DIMM data buffer (HV-DB 240) can be a very large data buffer such as terabit memory (TBM) to serve as temporary storage for the on-DIMM processing. In certain embodiments, as shown in FIG. 16. the HVDIMM 200 also provides another data path 1630 to allow data transfer between the system and the HV-Flash 220 via the HV Controller 230 and the HV-DB 240 without going through the HV-DRAM 210.

In further embodiments, As shown in FIG. 16, in certain embodiments, the Flash storage on the HVDIMM 200 includes a number of (e.g., 9) standard embedded multi-media card (eMMC) packages each having an embedded multi-media interface, a Flash controller and Flash memory. The HV Controller 230 also includes built-in redundant array of independent disks (e.g., RAID 3) circuit 1640 that provides dynamic hardware-based error-correction, full data recovery and data reconstruction, resulting in increased Flash life time. The RAID 3 feature also minimized requirement for data duplication.

The eMMCs generally support error correction in hardware. Issues can arise, however, when one of the eMMCs cannot correct certain errors in data from the Flash memory in its package during a read operation. In certain server systems, storage networks are built with redundancies (e.g., RAID) to enable further correction of errors at the storage system level. Before eMMCs were used to form the Flash storage, such redundancies were helpful as the Flash storage would output uncorrected data with error indication. An eMMC, however, does not produce output data if it cannot correct the errors in the data. Thus, the missing bit from an eMMC can cause system failure and/or unrecoverable data error.

To address this problem, the HVDIMM 200 according to certain embodiments includes at least one parity eMMC 1650 (e.g., the 9th eMMC in FIG. 2) that is used to store parity bits associated with the data stored in the rest of the eMMCs ("data eMMCs," e.g., the 1st to the 8th eMMCs in FIG. 2). The HVDIMM 200 further includes an error correction (e.g., RAID 3) circuit in, for example, the HV Controller 230. In certain embodiments, the RAID 3 circuit is included in the data paths between the storage and the system, which may also includes the TBM and/or the main memory, as shown in FIG. 2.

Figure 17:
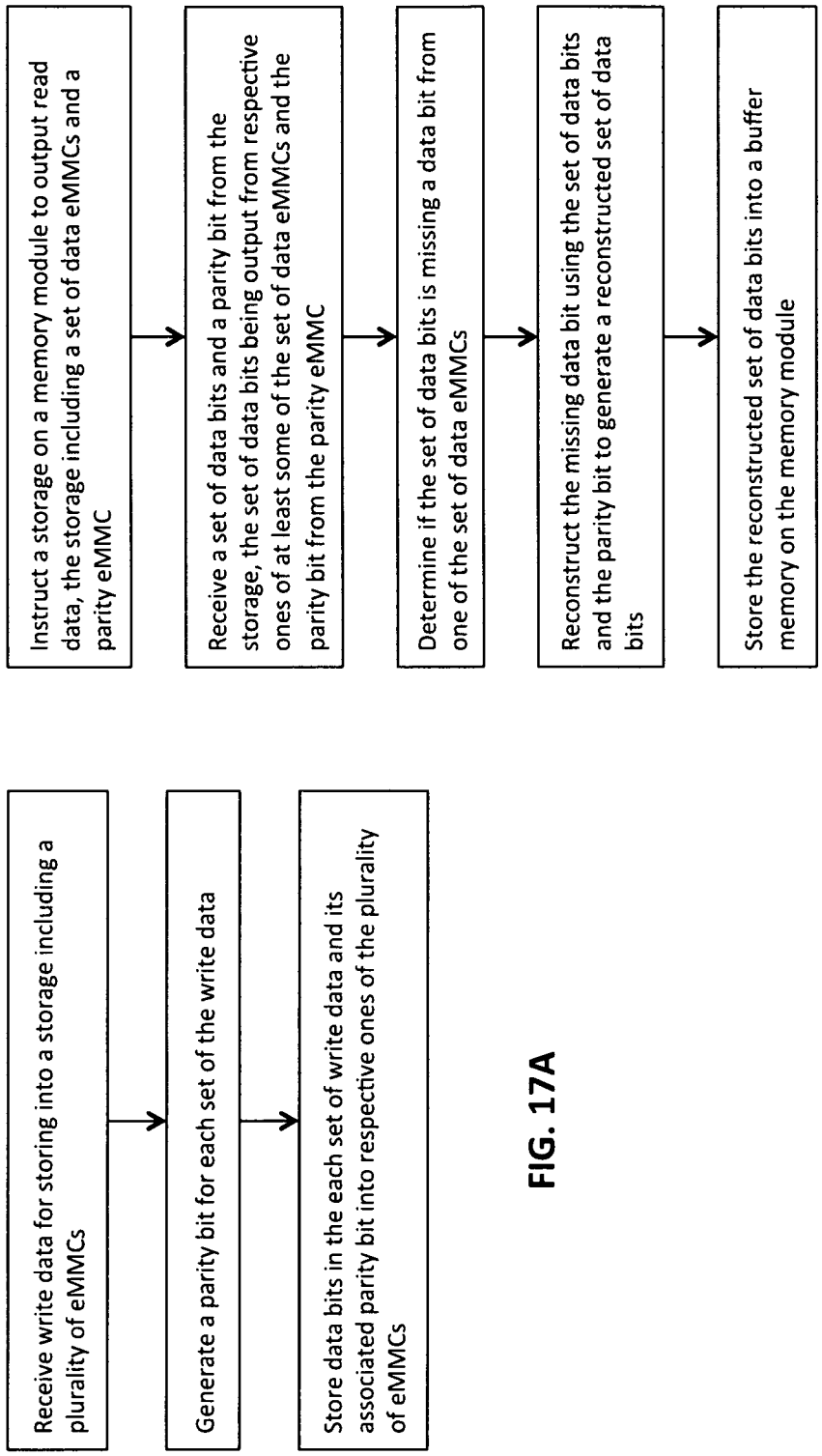
FIGS. 17A and 17B are flowcharts illustrating respectively RAID 3 processes for writing data into and reading data from the non-volatile memory subsystem in the hybrid memory module according to certain embodiments.

In certain embodiment, as shown in FIG. 17A, when write data is to be written to the storage, the RAID 3 circuit receives each set (e.g., 8 bytes) of write data from, for example, the TBM, and generates a parity byte for each set of data bytes. The RAID 3 circuit then outputs the data bytes together with its associated parity byte for storing in respective eMMC circuits. During a read operation, as shown in FIG. 17B, the HV Controller 230 outputs control and address signals to instruct the eMMCs to output read data. The RAID 3 circuit would receive sets of data bytes from the data eMMCs and parity bytes from the parity eMMC. For each set of data bytes received in parallel, the RAID 3 circuit would determine if the set of data bytes is missing a byte from one of the data eMMCs. If no data byte is missing, the RAID 3 circuit would move the set of data bytes along its intended path. If a data byte is missing from one of the data eMMCs, the RAID 3 circuit would reconstruct the missing data byte from the set of data bytes and the parity byte received in parallel with the set of data bytes and generate a reconstructed set of data bytes, which are placed in the TBM for forwarding to the main memory or the system, or stored in a buffer memory in the HV Controller 230 for further processing by the on-DIMM processor.

The HV-DB 240 is used to temporarily store data so as to make data transfers in the HV-DB 240 faster and more efficient. Since normally data may be transferred in and out of Flash memory at a slower speed than data is transferred to and from the system, the HV-DB 240 is used to buffer data to/from the Flash memory so the system does not have to slow down and wait for data to be written to or read from the storage subsystem. When the system writes data to the storage subsystem, the data is buffered into the HV-DB 240 at DRAM data I/O speed, which is much faster than Flash data I/O speed. The buffered data is written into the Flash memory on, for example, first in, first out basis. The same is true for the read direction. Thus, while reading from the storage subsystem, the CPU can engage in other processes with the main memory until the HV-DB 240 buffer has buffered a predetermined amount of data for transferring to the main memory or the system at the DRAM speed. On the other hand, when data is transferred from the main memory to the storage, the data is read from the DRAM according to a set of control/address (C/A) signals from the system or the HV Controller 230 and written into the HV-DB 240 according to another set of C/A signals from the HV Controller 230. While the DRAM can be engaged with the system on other tasks, the HV Controller 230 can transfer the data from the HV-DB 240 to the storage by reading the data from the HV-DB 240 and writing the data to the storage.

The components in the HVDIMM 200, e.g., the HV Controller 230, the main memory subsystem (or volatile memory subsystem), the HV-DB 240, the storage subsystem (or non-volatile memory subsystem), can be mounted on a same printed circuit board or disposed in close proximity to each other to allow fast and smooth data transfer therebetween.

Figure 18:
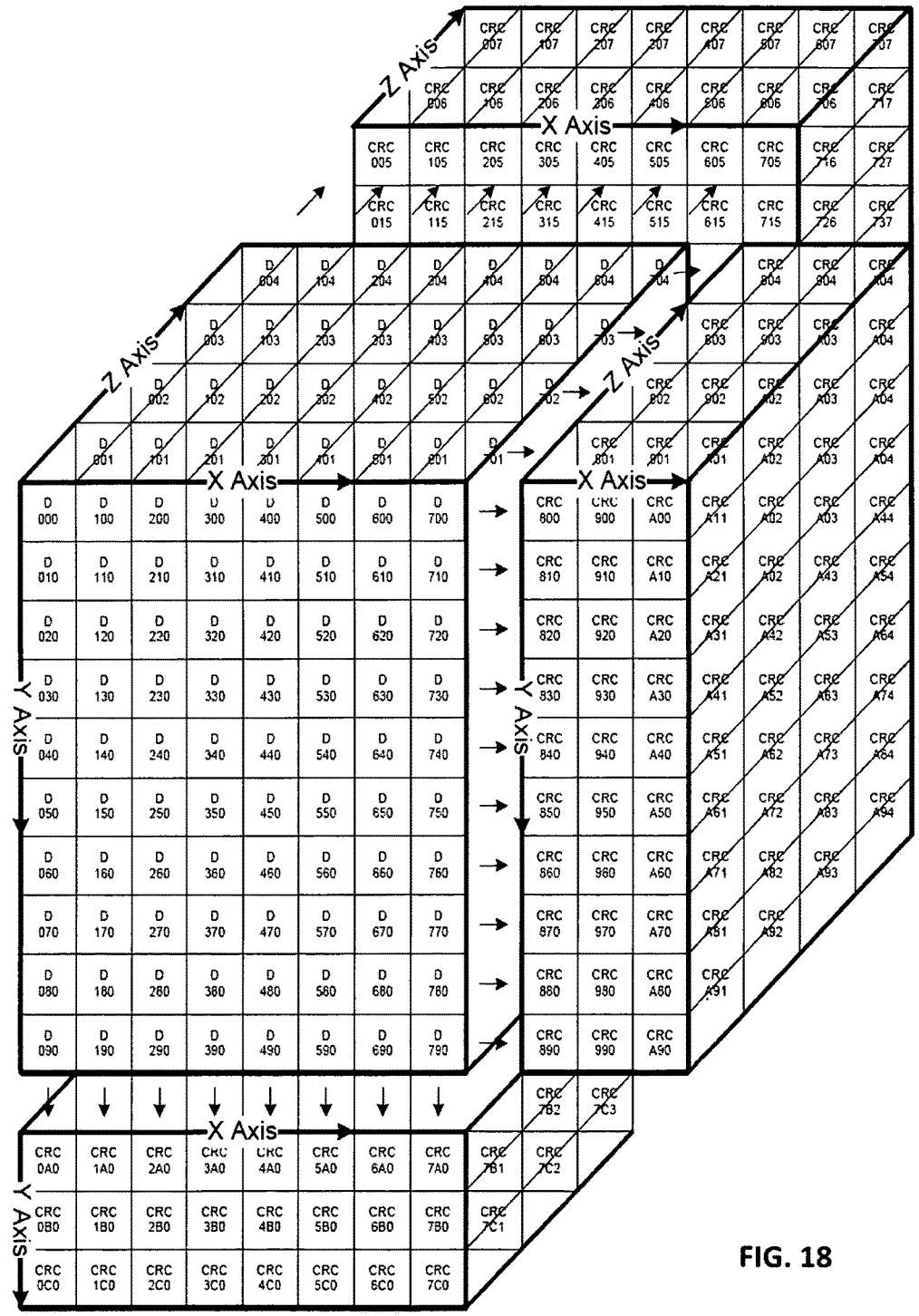
FIGS. 18-20 are block diagrams illustrating error detection/correction routines conducted by the module controller according to certain embodiments.

NAND Flash can be prone to low-reliability issues due to random errors generated by physical effects in the geometry of the NAND gates. Thus, in certain embodiments, to improve data integrity, the HV Controller 230 is configured to carry out a set of error detection/correction routines to detect and correct errors in the data stored in the HV-Flash 220. For example, every time when data is transferred from the HV-DRAM 210 to the HV-Flash 220, the HV Controller 230 would perform error correction coding on the data. In certain embodiments, as shown in FIG. 18, the data bits are grouped and each group of data bits are arranged in a three-dimensional matrix. Cyclic Redundancy Check (CRC) codes can be computed using predetermine algorithm along each of the X, Y and Z axis for the three dimensions of the matrix. The CRC codes are then stored together with the data into the HV-Flash 220. In certain embodiments, the HV Controller 230 includes on-chip memory spaces (e.g., 1 k-2 k of SRAM) and/or shift registers to store a copy of the data for the CRC calculation while the data is being transferred from the DRAM to the Flash.

Figure 19:
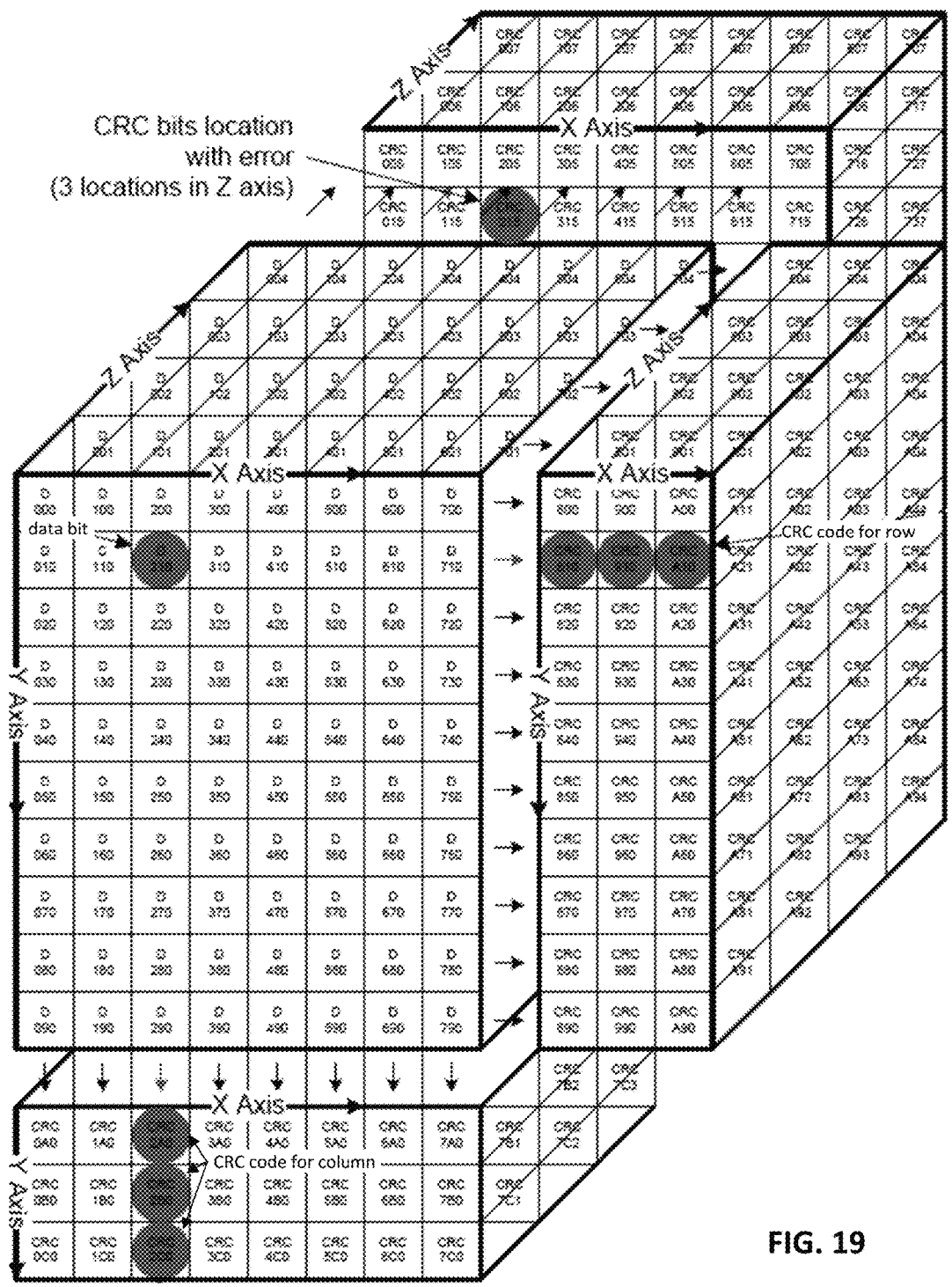
Figure 20:
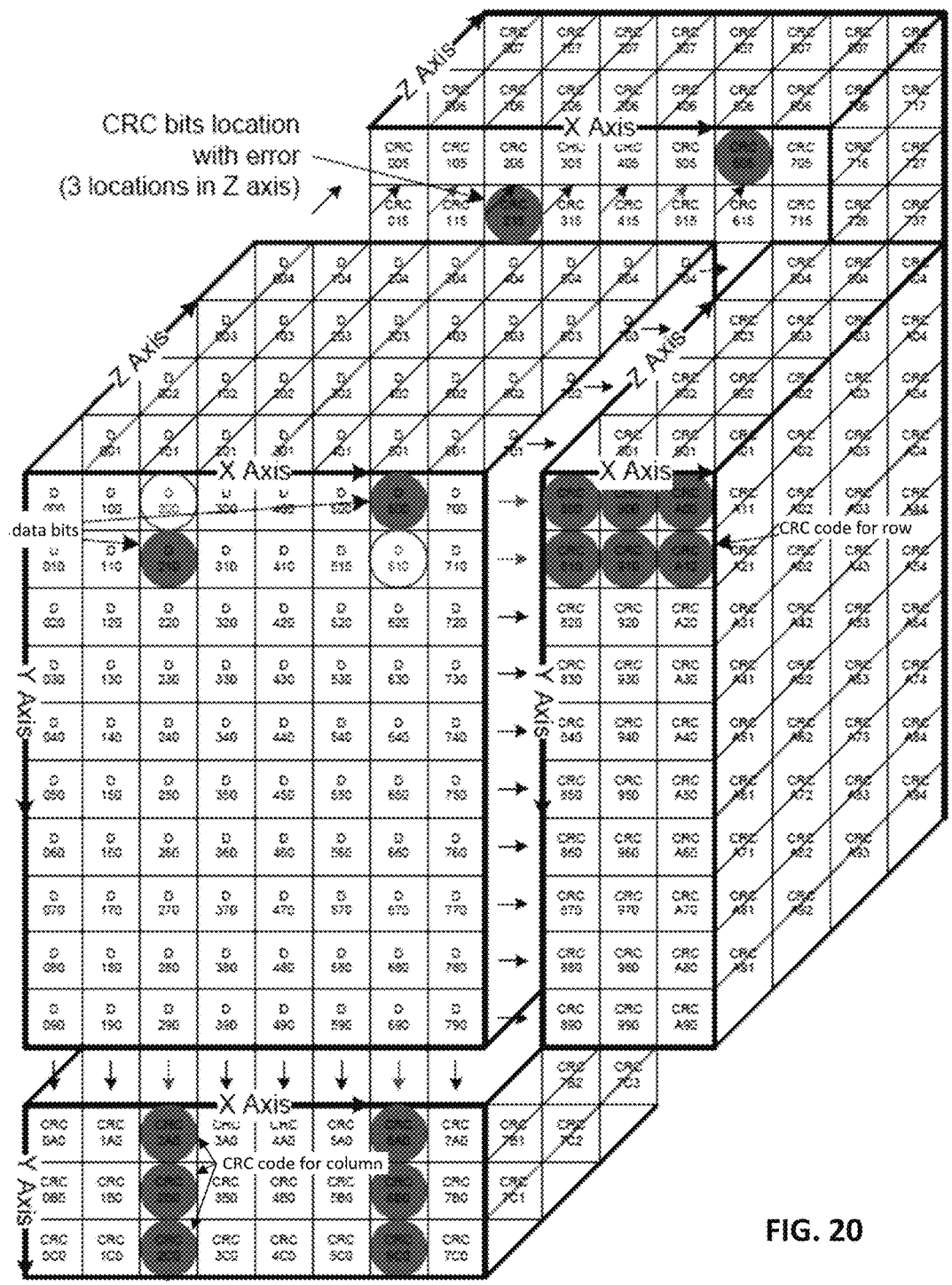

When the data is transferred from HV-Flash 220 to HV-DRAM 210, the HV Controller 230 would have each group of data arranged again into the same matrix format, and CRC codes are computed again using the same predetermined algorithm along each of the axis as shown in FIG. 8. The newly computed CRC codes are compared with the corresponding CRC codes received with the data. If there were no error in the data, the newly computed CRC codes would match the corresponding CRC codes received with the data. If the received data contain one or more errors as shown in FIGS. 19 and 20, there would be mismatch between the newly computed CRC codes and the received CRC codes. With the data arranged in the matrix format, such mismatch in the CRC codes can be used to identify the location of an erroneous data bit, and correction can be made by simply flipping the erroneous data bit at the identified location.

FIG. 19 illustrates an exemplary situation where one of the bits in a X-Y plane of the data matrix (e.g., bit D210) is erroneous. This can be detected with CRC check in just the X and Y directions to pinpoint the bit location with the error. As shown in FIG. 19, bit D210 is part of a row of bits D010, D110, D210, ... and D710 along the X direction, and also part of a column of bits D200, D210, D220, ..., D290 along the Y direction. So, if both the newly calculated CRC code for the row of bits (CRC810, CRC910, and CRCA10) and the newly calculated CRC code for the column of bits (CRC2A0, CRC2B0, and CRC2C0) do not match the corresponding CRC codes received with the data, while all other newly calculated CRC codes in the same X-Y plane match the corresponding CRC codes received with the data, the location of the error would be at the intersection of the row of bits and the column of bits, i.e., D210, as shown in FIG. 19.

FIG. 20 illustrates an exemplary situation where two of the data bits in a same X-Y plane in the data matrix (e.g., bit D210 and bit D600) are erroneous. To properly pinpoint the locations of the bit errors, CRC check needs to be conducted in X, Y and Z directions. As shown in FIG. 10, CRC check conducted in just the X and Y directions in this situation would indicate four possible locations of bit error (e.g., D200, D210, D600 and D610). Additional CRC check in the Z direction is thus use to pinpoint the exact locations of bit error (e.g., D210 and D600).

In certain embodiments, the HV Controller 230 performs CRC checks on copies of the data which are being transferred from the HV-Flash 220 to the HV-DRAM 210. Therefore, by the time HV Controller 230 detects a bit error, the erroneous data bit may have already been written into the DRAM. To correct the bit error, the HV Controller 230 can perform a read-modify-write operation to read a segment of data containing the erroneous bit from the DRAM, modify the erroneous bit, and then write the data segment back into the DRAM.

As stated above, Flash memory has a finite number of program-erase cycles, and frequent erase/write operations can cause Flash memory cells to wear out, causing reliability issues. To prolong the life of HV-Flash 220, the HVDIMM 200 includes a scratch Flash in additional to the main Flash (as shown in FIG. 12) and the HV Controller 230 is configured to execute an error detection/correction process when data is moved back and forth between the HV-DRAM 210 and HV-Flash 220. By using the error detection/correction process, which is discussed below, the HVDIMM 200 can support random updates to Flash without reducing the Flash life by avoiding program/erase (P/E) operations to the main Flash as much as possible.

In certain embodiments, the scratch Flash is employed to hold updated (modified) data when a Flash block is filled. The modified data in the scratch Flash can be incorporated into the Flash block when the system is ready to close the block. For example, if a particular task/application requires 100 updates to each of 100 Flash pages in Flash block, 10,000 updates would be needed. If there is 25 initially unfilled page areas in a block, this task/application requires 400 P/E operations, which amounts to 3.2 GB of data being rewritten. However, if the modified data is stored in the scratch Flash, then the block only needs 1 P/E operation. As for the scratch Flash area, only 10,000 pages will be written, which amounts to only 80 MB of data being rewritten.

In certain embodiments, the scratch Flash, unlike storage or main Flash, does not have to follow the block concept, although it follows standard Flash operations. Thus, each page update is written into the next open (unwritten) page space. A written page is marked as 'stale' when either the page is updated again and the updated page is written into a new location, or the page is copied into the storage Flash by the system closing a block in the storage Flash. When all pages in a physical block in the scratch Flash are marked as 'stale', the block is erased and then marked as open (or available). In certain embodiments, for a block that contains mostly 'stale' pages, the pages that are not marked 'stale' are copied into a new location so that the block can be erased.

Figure 21:
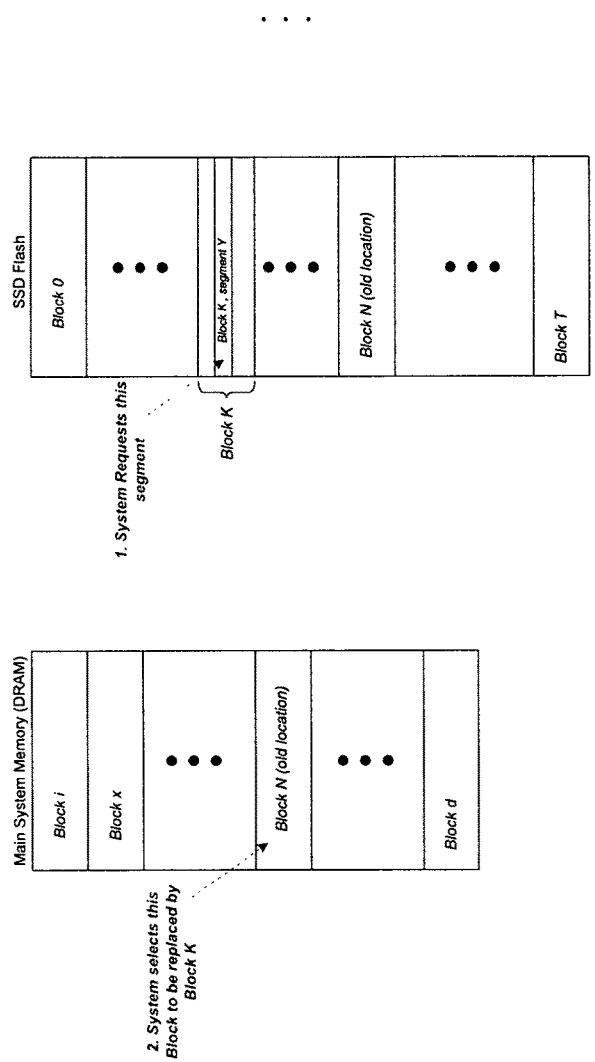
FIGS. 21-22 illustrate a conventional SSD or Flash operation.
Figure 22:
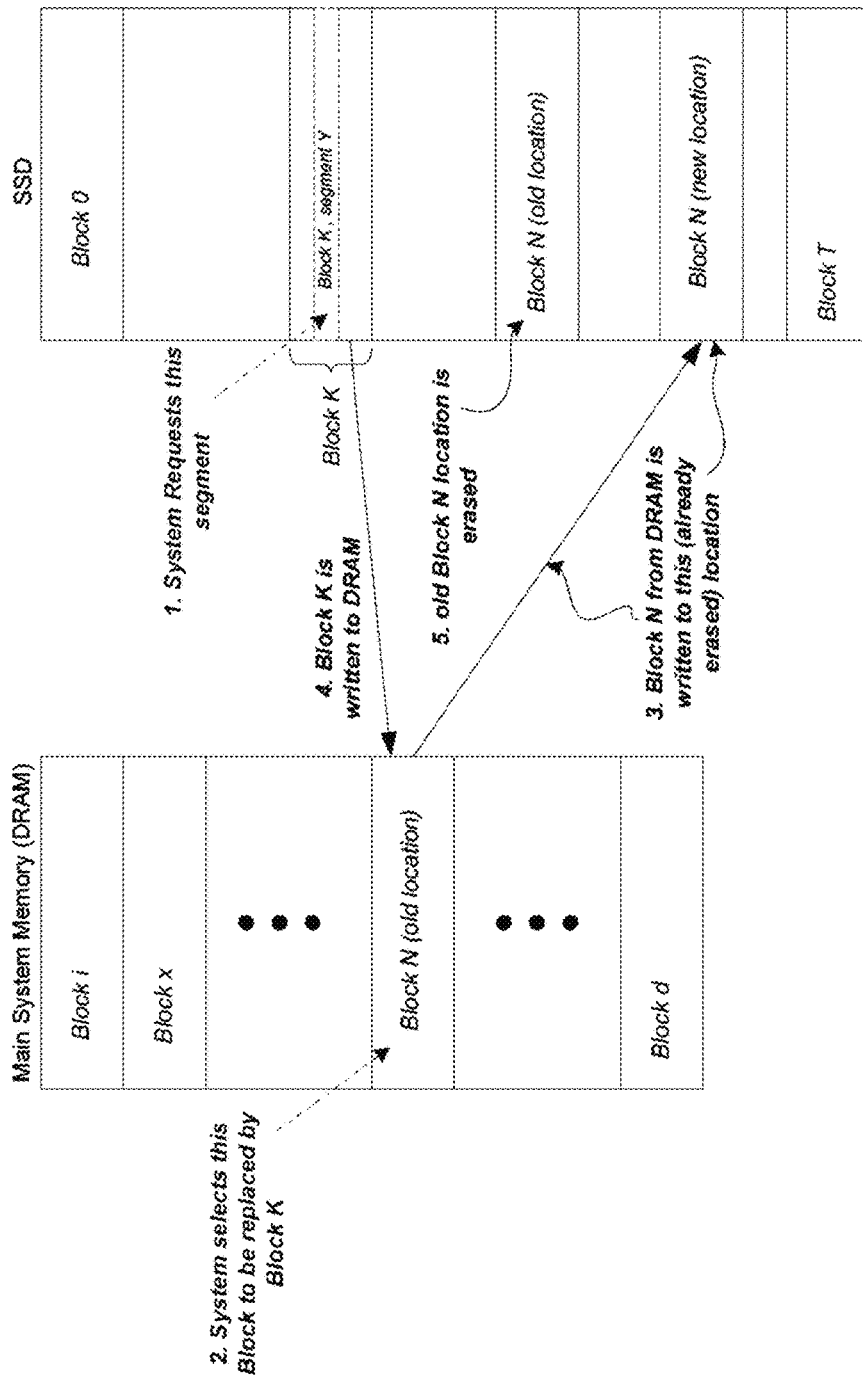

FIGS. 21-22 illustrate a conventional SSD or Flash operation where, according to industry standard replacement algorithm, when a system requests to open a segment in a Flash block (Block K), the system must select a block (Block N) in the main memory (DRAM) to be replaced by the Flash block. A new block in the Flash is opened to accommodate the data in Block N before Block N is replaced by the data in Block K. Another block in the Flash where block N was originally taken from is thereafter erased.

Figure 23:
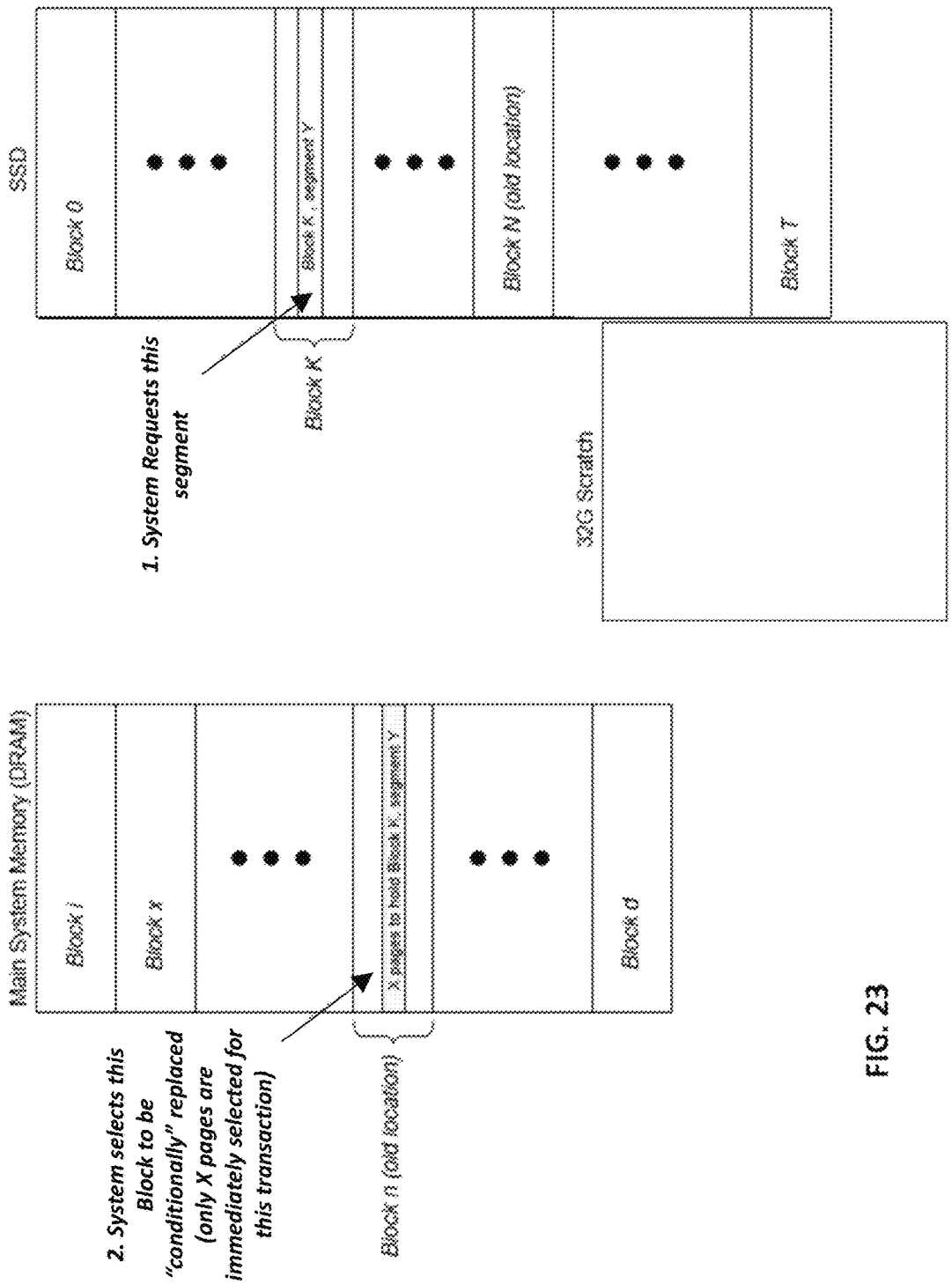
FIGS. 23-26 illustrate Memory Window operations in the hybrid memory module according to certain embodiments.
Figure 24:
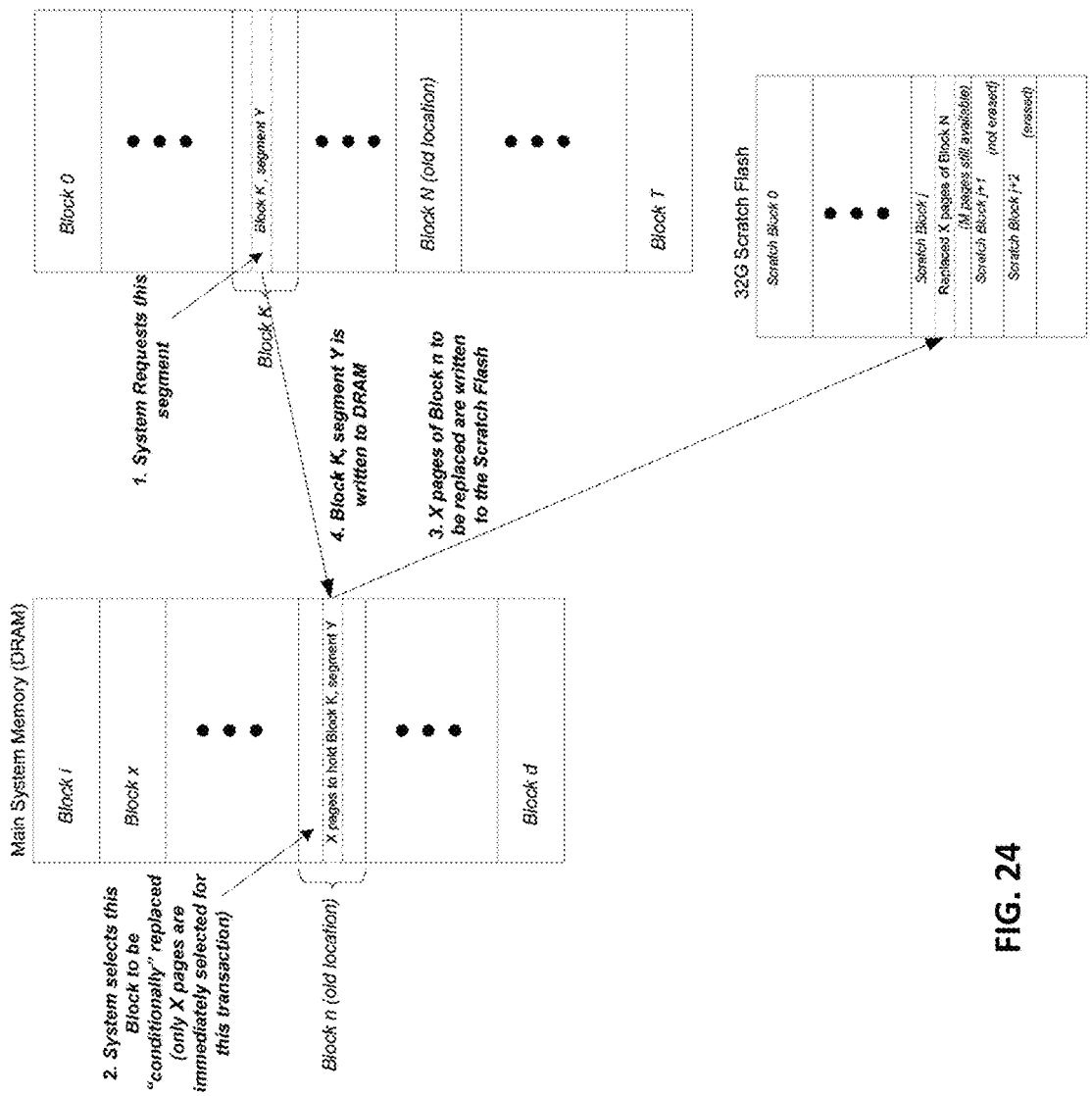

FIGS. 23-24 illustrate a Memory Window operation in the HVDIMM 200 according to certain embodiments. Here, in response to a system request to open a new segment in the main Flash, and a block is selected in the HV-DRAM 210, but only the pages in the DRAM block that are required for the selected segment (e.g., X pages for segment Y) are actually subject to replacement. The X pages are written to the scratch Flash before data from segment Y is written into the space held by the X pages in the DRAM. Thus, data is moved between HV-DRAM 210 and HV-Flash 220 page by page and no new blocks in the Non-volatile memory are required to be written or erased when the new segment is opened for dynamic random access.

Figure 25:
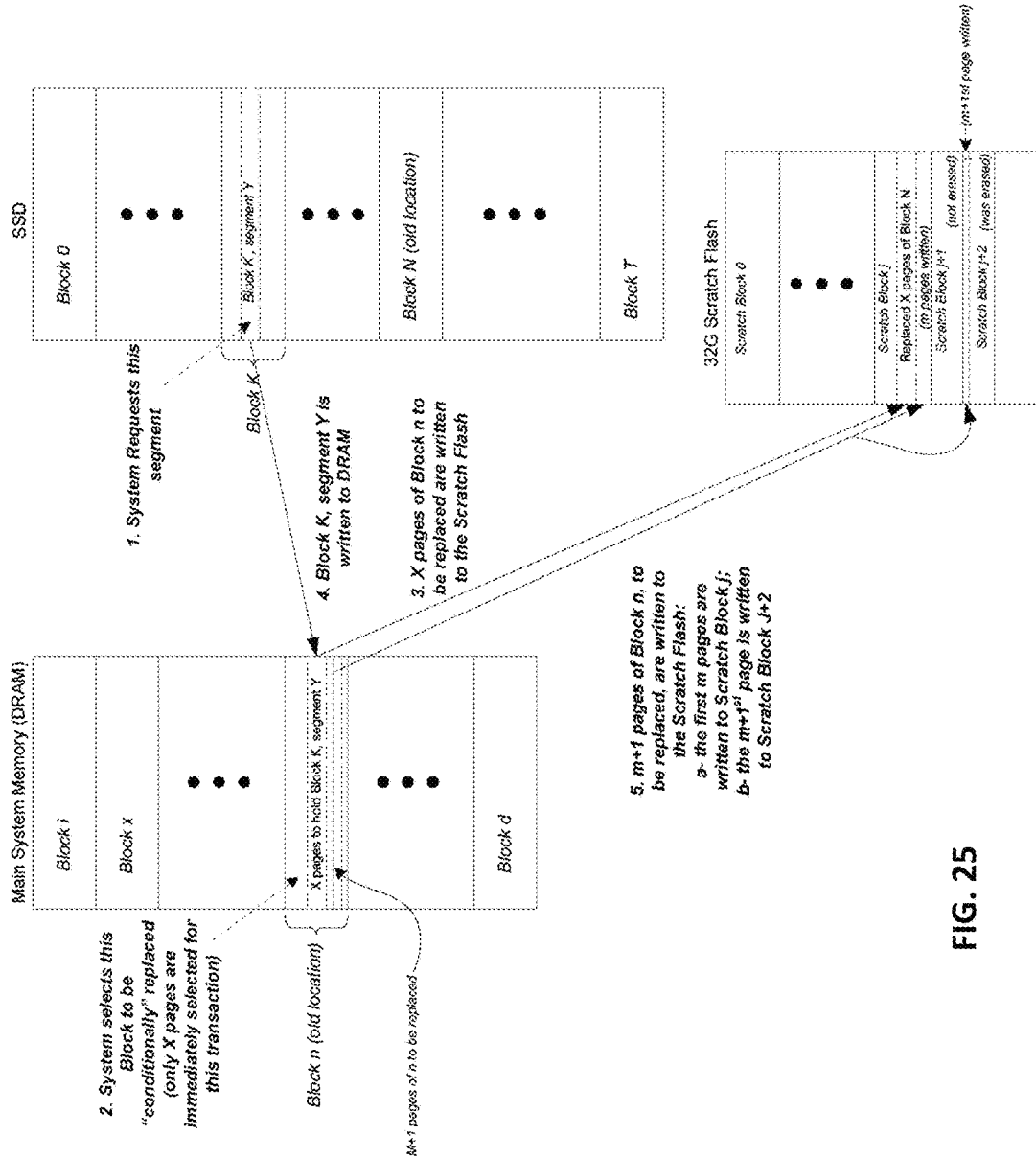

At some point, a current scratch Flash block may be filled up as data is moved from the Flash to the DRAM page by page. For example, as shown in FIG. 25, if a memory window operation requires M+1 pages to be replaced in DRAM and the current scratch block j only has M pages left unfilled, the first M pages of the M+1 pages can be written into Block j, while the M+1$^{st}$ page is written into Block j+1 in the scratch Flash.

Figure 26:
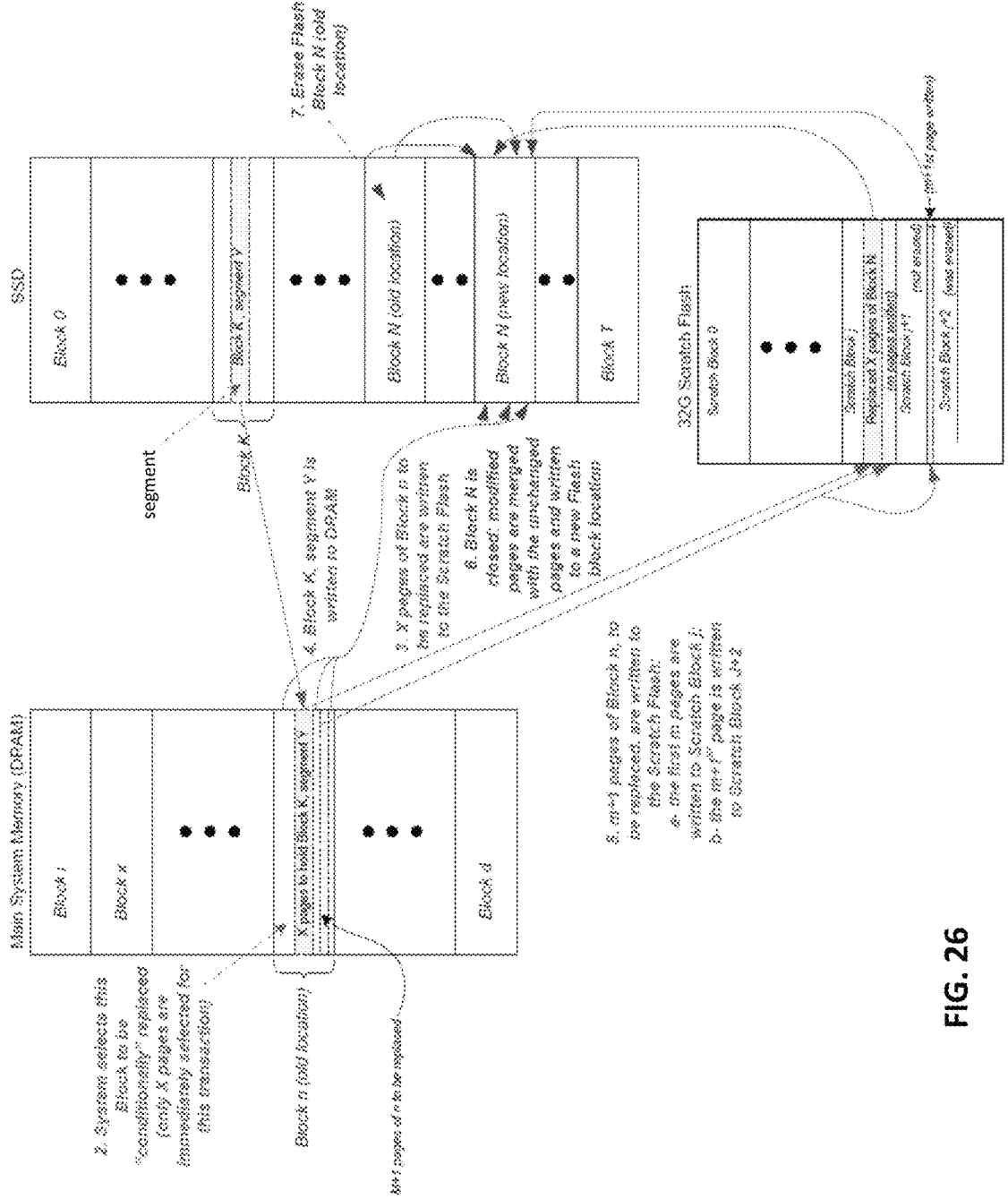

The HV Controller 230 is configured to keep track of data movements among the main Flash, the DRAM and the scratch Flash. When the system requests to close a block in the DRAM, a new block in the Flash is opened to accommodate the data in the to-be-closed block in DRAM. Since some of the data in the to-be-close block may have been put in the scratch Flash, the HV Controller 230 is further configured to merge data in the to-be-closed block from the DRAM with the data taken from the to-be-closed block and stored in the scratch Flash, as illustrated in FIG. 26. The merged data is stored in the new block in the Flash and an old block in the Flash where the to-be-erased block in the DRAM was taken from is thus erased.

In addition to using the scratch Flash to prolong the life of the main Flash, the HV Controller 230 is also configured to perform wear leveling by equalizing average usage time of each block in the HV-Flash 220. In certain embodiments, such wear leveling can be done by a round robin method. The HV Controller 230 uses its address mapping management capabilities and relatively large memory space to keep track of the associated address changes.

Figure 27:
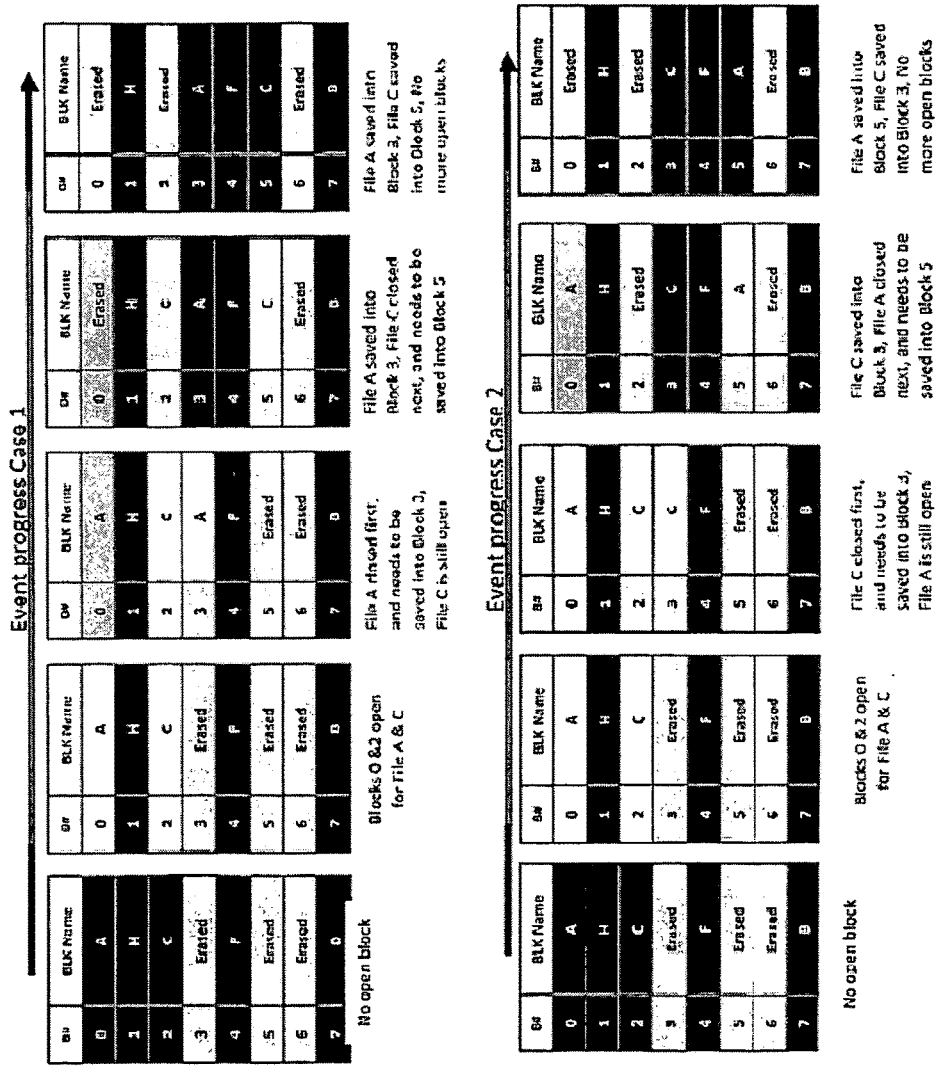
FIG. 27 illustrates a simplified example of a round-robin wear leveling technique according to certain embodiments.

FIG. 27 illustrates a simplified example of a HVDIMM 200 round-robin wear leveling technique, according to certain embodiments. As shown in FIG. 27, both Event Progress Cases 1 and 2 have Blocks 0 and 2 opened for Memory Window operations. In Event Progress Case 1, File A is closed first while in Event Progress Case 2, File C is closed first. Thus, for Case 1, File A is written into the first empty (erased) block (B#3). For Case 2, File C is written into block B#3.

Instead of or in addition to being used as main memory, the HVDIMM 200 can also be used as a storage device to facilitate direct data transfers within an intranet network.

Recent developments in cloud networking and computing require efficient ways to transfer and store data. Since the cloud environment supports many different types of applications that share computational power as well as database, any particular server or storage bottleneck can impact the overall performance of the cloud network.

There are two types of data transfers, intranet and internet. An intranet provides a closed network within an organization, which shares computing resources and information, while internet networks are between intranets or between organizations.

Internet (between organizations) data transfers are generally less concerned about data transfer latency. On the other hand, intranet data transfers require prompt responses and is less tolerant of data transfer latency. This is especially true when a task is farmed out to multiple servers for parallel computation using shared operating system, program, and database. In such cases, data coherency is required among these servers for correctly executing the task. Therefore, any data transfer latency in one server can slow down the task execution.

There are also two types of data transfers in an intranet: data transfers within each individual server and data transfers amongst various servers. The data transfers amongst various servers use internet protocol technology to share information, operational systems, or computing resources. The data transfers within a server is generally handled by the CPU, and occur amongst memory devices and network connections via the CPU.

Currently, transferring data between intranet servers requires a transmitting server CPU to gather the data from either a storage or from the main memory, packetize the data, and put it onto the network. The receiving server CPU needs to extract the data and to store it in a storage or the main memory. Transferring data within a server requires the CPU to read data from one memory coupled to the CPU and write the data into another memory device also coupled to the CPU.

For example, when a process running on the CPU attempts to allocate more memory than the system has available, the OS would swap memory pages to and from the storage. If a page is selected for replacement and "Page Out" is referenced again, it has to be paged in (read in from storage). This would involve waiting for I/O completion and the total responding time is the sum of:

(Page Out Time)+(Page In Time)

where (Page Out Time)=(Memory Time)+(CPU Time)+(Bus Time)+(Storage Time)

and (Page In Time)=(Storage Time)+(Bus Time)+(CPU Time)+(Memory Time).

In both cases, data transfer latency can be reduced if the data does not need to go through the CPU. In other words, if direct data transfer occurs from a memory device to the network, then the data transfer latency amongst servers will be minimized. Data transfer latency within a server can also be reduced if the data is transferred directly between memory devices without going through the CPU.

In the intranet network, if a process running on the CPU attempts to allocate more memory than the system has available, the OS would swap memory pages to and from the IO Storage. If the page is selected for replacement and "Page Out" is referenced again, it has to be paged in. This would involve waiting for I/O completion, but the total responding time is now the sum of:

(Page Out Time)+(Page In Time)

where (Page Out Time)=(Memory Time)+(HV Time)+(Storage Time)

and (Page In Time)=(Storage Time)+(HV Time)+(Memory Time)

Thus, the total responding time is significantly shortened.

Figure 28:
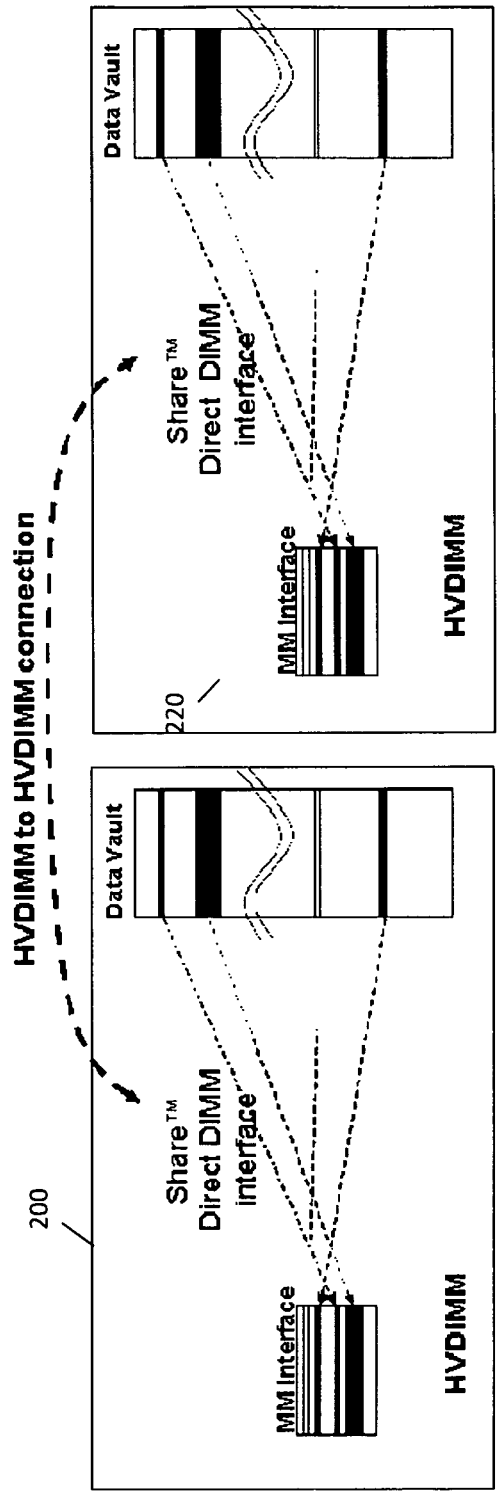
FIG. 28 illustrates a hybrid memory module coupled directly to another hybrid memory module or any other storage devices via their respective network interface circuits.

In certain embodiments, the HV Controller 230 is configured to facilitate data transfers between different HVDIMMs 200 by providing a network interface ("Share™ Direct DIMM Interface") via the HV-NIC. For example, as shown in FIG. 28, an HVDIMM 200 (on the left) can be coupled directly to another HVDIMM 200 (on the right) or any other storage devices via their respective NIC devices, and the HV Controller 230 in either HVDIMM 200 is configured to transfer data between the DRAM on one HVDIMM 200 and the Flash in the other HVDIMM 200, between the DRAM on one HVDIMM 200 and the DRAM on the other HVDIMM 200, between the Flash on one DIMM and the Flash on the other DIMM, and also between the HVDIMM 200 and any other storage devices, using similar techniques as discussed above.

Figure 29:
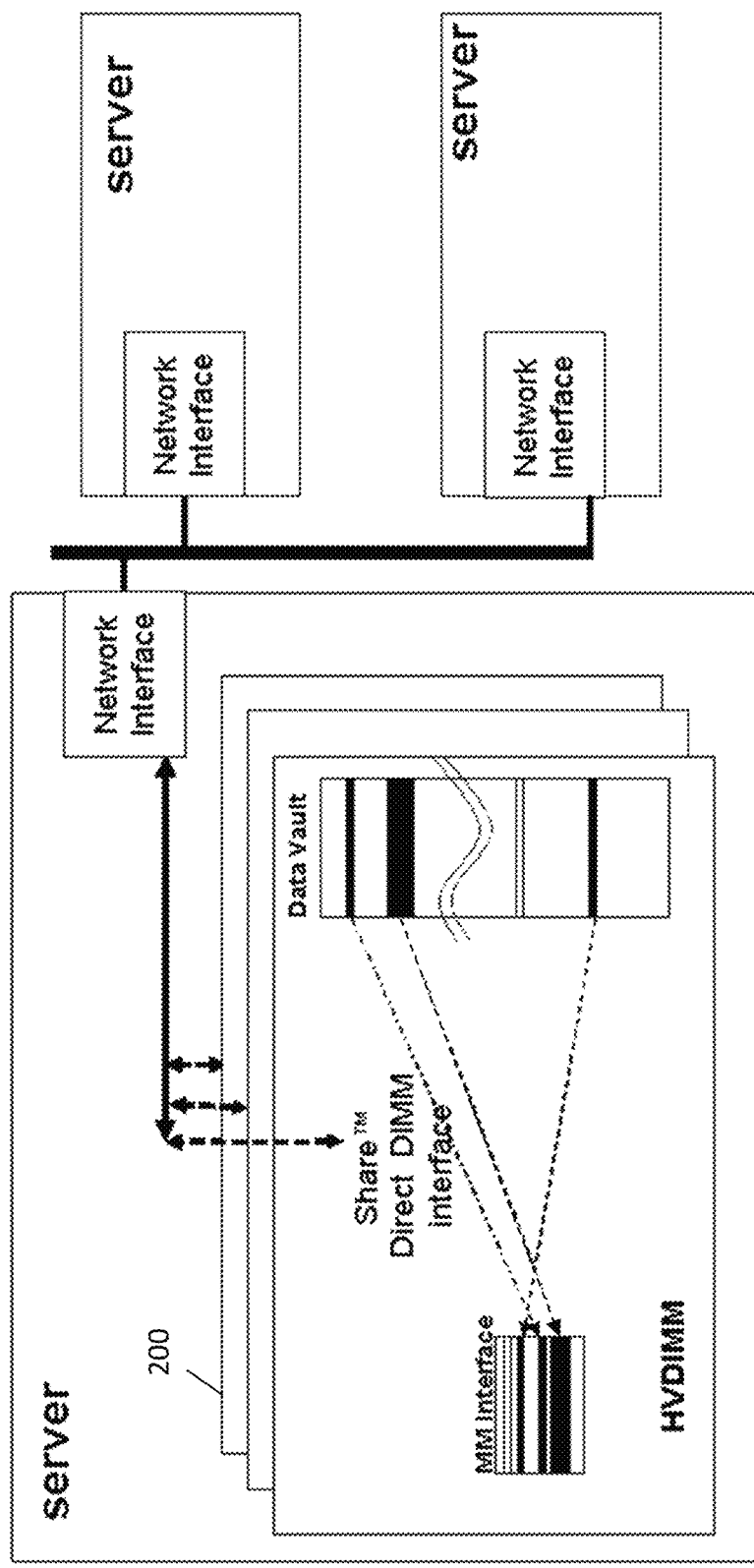
FIG. 29 illustrates one or more hybrid memory modules in a server system in an intranet network being coupled directly to the intranet network via respective network interface circuits.

Additionally, the HV Controller 230 is also configured to facilitate data transfers between different server systems. For example, as shown in FIG. 29, the HVDIMM(s) 200 in each server system in an intranet network can be coupled directly to the intranet network via their respective HV-NIC devices and/or another Network Interface device. Thus, the HV Controller 230 on each HVDIMM 200 in a particular server can initiate and control data transfers directly between HVDIMM 200s in different servers.

We claim:

1. A memory module for use in a computer system, the computer system including a memory controller coupled to the memory module via a system bus, the system bus including a data bus and a control/address (C/A) bus, comprising:
   a volatile memory subsystem coupled to the system bus and capable of serving as main memory for the computer system, the volatile memory subsystem including dynamic random access memory (DRAM) devices;
   a non-volatile memory subsystem configured to provide data storage for the computer system; and
   a module controller coupled to the volatile memory subsystem, the non-volatile memory subsystem, and the system bus, wherein the module controller is configured to read first data from the non-volatile memory subsystem in response to a first command received via the system bus, the first command being a command to transfer data from the non-volatile memory subsystem to the volatile memory subsystem, wherein the module controller is further configured to provide at least one portion of the first data to the volatile memory subsystem a certain time period after receiving a dummy write memory command via the C/A bus so that the at least one portion of the first data appear at inputs/outputs (I/O) of the DRAM devices in accordance with a latency parameter of the DRAM devices, wherein the volatile memory subsystem is configured to receive the at least a portion of the first data in response to the dummy write memory command.

2. The memory module of claim 1, further comprising a dedicated data path for data transfers between the volatile memory subsystem and the non-volatile memory subsystem, wherein the dedicated data path includes first data signal lines between the volatile memory subsystem and the module controller, and second data signal lines between the module controller and the non-volatile memory subsystem, wherein the dedicated data path does not include the data bus, wherein the first data is transferred from the non-volatile memory subsystems to the module controller via the second data signal lines, and wherein the at least one portion of the first data is transferred from the module controller to the volatile memory subsystem via the first data signal lines.

3. The memory module of claim 2, further comprising a data buffer coupled to the module controller, wherein the dedicated data path also includes third data signal lines between the data buffer and the module controller, and wherein the at least one portion of the first data is stored in the data buffer before being provided to the volatile memory subsystem.

4. The memory module of claim 3, wherein the data buffer is coupled to the module controller via the third data signal lines and a set of module C/A signal lines, and wherein the module controller issues a memory command to the data buffer via the set of module C/A signal lines to cause the data buffer to output the at least one portion of the first data before providing the at least one portion of the first data to the volatile memory subsystem.

5. The memory module of claim 4, wherein the module controller is configured to monitor memory commands on the C/A bus and to delay issuing further memory commands to the data buffer to cause the data buffer to out one or more portions of the first data in response to one or more memory commands received via the C/A bus, the one or more memory commands are one or more normal memory access commands directed to the volatile memory subsystem.

6. The memory module of claim 1, wherein the module controller includes at least one processor, and wherein the module controller is configured to pre-process the first data read from the non-volatile memory subsystem before providing the at least one portion of the first data to the volatile memory subsystem.

7. The memory module of claim 6, wherein the module controller is configured to search the first data read from the non-volatile memory subsystem in accordance with a set of criteria, and where the at least one portion of the first data comprises a portion of the first data from the non-volatile memory subsystem meeting the set of criteria.

8. The memory module of claim 2, wherein the non-volatile memory subsystem includes a plurality of non-volatile memory packages including a first set of non-volatile memory packages for storing data and at least one non-volatile memory package for storing parity bits associated with the data, and wherein the dedicated data path further includes an error correction circuit that restores corrupted data from the non-volatile memory system using the parity bits.

9. The memory module of claim 1, wherein the module controller is further configured to snoop second data output from the volatile memory subsystem in response to a second command received via the C/A bus and a dummy read memory command received via the C/A bus, wherein the volatile memory subsystem is configured to output the second data in response to the dummy read memory command, and wherein the module controller is further configured to transfer the second data to the non-volatile memory subsystem in accordance with the second command and a set of data signals received via the data bus, the second command being a command to transfer data from the volatile memory subsystem to the non-volatile memory subsystem, the set of data signals being associated with the second command.

10. The memory module of claim 9, further comprising a data buffer, wherein the data buffer comprises DRAM and wherein the memory module is configured to store the second data into the data buffer after snooping the second data output from the volatile memory subsystem and before transferring the second data into the non-volatile memory subsystem.

11. The memory module of claim 9, wherein the module controller is configured to store the second data into the non-volatile memory subsystem in DRAM format.

12. The memory module of claim 1, further comprising a network interface circuit, wherein the memory module is configured to couple directly to another memory module via the network interface circuit and to receive data from and transmit data to the other memory module via the network interface circuit.

13. The memory module of claim 1, further comprising a network interface circuit, wherein the memory module is configured to couple directly to a computer network via the network interface circuit and to receive data from and transmit data to the computer network via the network interface circuit.

14. A method performed by a memory module coupled to a memory controller via a system bus in a computer system, the system bus including a data bus and a control/address (C/A) bus, the memory module including a volatile memory subsystem, a non-volatile memory subsystem, the method comprising:
  receiving a first command from the memory controller via the C/A bus;
  in response to the first command being a command to transfer first data from the non-volatile memory subsystem to the volatile memory subsystem, receiving via the data bus first information associated with the first command, the first information including at least one of a first address in the non-volatile memory subsystem at which the first data is located and a second address in the volatile memory subsystem to which the first data is to be transferred, and reading the first data requested by the first command from the non-volatile memory subsystem;
  receiving a dummy write memory command from the memory controller via the C/A bus; and
  in response to the dummy write memory command being associated with the first command, providing at least one portion of the first data to the volatile memory subsystem a certain time period after receiving the dummy write memory command so that the at least one portion of the first data appear at data inputs/outputs (I/O) of the volatile memory subsystem in accordance with a latency parameters of the volatile memory subsystem, and receiving the at least one portion of the first data at the volatile memory subsystem in response to the dummy write memory command.

15. The method of claim 14, further comprising:
  receiving a second command from the memory controller via the C/A bus, the second command being a command to transfer second data from the volatile memory subsystem to the non-volatile memory subsystem;
  receiving at least one dummy read memory command from the memory controller via the C/A bus; outputting the second data from the volatile memory subsystem in response to the dummy read memory command; and in response to the at least one dummy read memory being associated with the second command, snooping the second data output from the volatile memory subsystem and storing the second data into the non-volatile memory subsystem.

16. The method of claim 14, wherein the memory module further comprises a data buffer, the method further comprising:
storing the at least one portion of the first data into the data buffer before providing the at least one portion of the first data to the volatile memory subsystem.

17. The method of claim 16, wherein the memory module further comprises a module controller, the method further comprising:
issuing a command to the data buffer to preload the at least one portion of the first data from the data buffer into the module controller before receiving the dummy write memory command.

18. The method of claim 16, the method further comprising:
issuing a first read command to the data buffer to cause the data buffer to output a first portion of the first data;
issuing a pause command to the data buffer to pause data transfer between the data buffer and the volatile memory subsystem subsequent to issuing the first read command and in response to a third memory command, the third memory command being a memory command for the computer system to access the volatile memory subsystem; and
issuing a second read command to the data buffer subsequent to issuing the pause command, the second read command to cause the data buffer to output a second portion of the first data.

19. The method of claim 14, further comprising:
searching the first data read from the non-volatile memory subsystem in accordance with a set of criteria, wherein the at least one portion of the first data comprises a portion of the first data from the non-volatile memory subsystem meeting the set of criteria.

20. The method of claim 14, wherein the first data is read from the non-volatile memory subsystem together with parity bits, the method further comprising:
restoring corrupted portions of the first data using one or more of the parity bits.

21. The memory module of claim 2, further comprising a printed circuit board, wherein the volatile memory subsystem, non-volatile memory subsystem, and the module controller are mounted on the printed circuit board.

22. The memory module of claim 21, further comprising switches, wherein the module controller is configured to control the switches to direct data signals associated with the first command to the module controller in response to the first command, wherein the module controller is further configured to reset the switches to allow the volatile memory subsystem to perform normal system memory operations after the at least a portion of the first data has been written into the volatile memory subsystem.

23. The memory module of claim 21, wherein the module controller is configured to receive data signals associated with the first command in response to the first command, and wherein the data signals associated with the first command includes a source address range in the non-volatile memory subsystem and a destination address in the volatile memory subsystem.

24. The memory module of claim 23, wherein the dummy write command is directed to an address in the volatile memory subsystem that is the same as the destination address associated with the first command.

25. The method of claim 14, further comprising a module controller, wherein receiving at the module controller data signals associated with the first command from the data bus, the data signals carrying the first information.

26. The method of claim 25, wherein the dummy write command is directed to an address in the volatile memory subsystem that is the same as the second address.

* * * * *

UNITED STATES PATENT AND TRADEMARK OFFICE
CERTIFICATE OF CORRECTION

| | | |
|---|---|---|
| PATENT NO. | : 10,380,022 B2 | |
| APPLICATION NO. | : 14/536588 | |
| DATED | : August 13, 2019 | |
| INVENTOR(S) | : Lee et al. | |

It is certified that error appears in the above-identified patent and that said Letters Patent is hereby corrected as shown below:

On the Title Page

(57) ABSTRACT, Line 2, please delete "to coupled to" and insert --to be coupled to--;

(57) ABSTRACT, Line 2, please delete "channel in computer" and insert --channel in a computer--;

(57) ABSTRACT, Line 7, please delete "and the C/A" and insert --and a C/A--;

In the Claims

Claim 23, Column 26, Line 23, please delete "includes a source" and insert --include a source--.

Signed and Sealed this
Twenty-ninth Day of October, 2019

Andrei Iancu
*Director of the United States Patent and Trademark Office*